US010256643B2

(12) United States Patent
Toya

(10) Patent No.: US 10,256,643 B2
(45) Date of Patent: Apr. 9, 2019

(54) ELECTRICITY STORAGE SYSTEM AND CONTROL METHOD OF ELECTRICITY STORAGE SYSTEM

(71) Applicant: Panasonic Intellectual Property Management Co., Ltd., Osaka (JP)

(72) Inventor: Shoichi Toya, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 114 days.

(21) Appl. No.: 15/423,590

(22) Filed: Feb. 3, 2017

(65) Prior Publication Data
US 2017/0264110 A1   Sep. 14, 2017

(30) Foreign Application Priority Data
Mar. 8, 2016   (JP) .................. 2016-045025

(51) Int. Cl.
 *H02J 7/00* (2006.01)
(52) U.S. Cl.
 CPC .......... *H02J 7/0016* (2013.01); *H02J 7/0021* (2013.01)
(58) Field of Classification Search
 CPC .............. H02J 7/0016; H02J 7/0021

USPC ........................................................ 320/126
See application file for complete search history.

(56) References Cited

U.S. PATENT DOCUMENTS

2013/0257381 A1* 10/2013 Diamond ............ B60L 11/1861
                                                          320/134
2016/0226268 A1*  8/2016 Okui ..................... H02J 7/0018
2017/0005497 A1*  1/2017 Sherstyuk ............. H02J 7/0068

FOREIGN PATENT DOCUMENTS

JP        2014-096918        5/2014

* cited by examiner

*Primary Examiner* — Suchin Parihar
(74) *Attorney, Agent, or Firm* — Greenblum & Bernstein, P.L.C.

(57) ABSTRACT

An system is provided that includes a first circuit that serially connects storage battery units, second circuits, and adjusters that adjust an amount of current flowing at the second circuits. The system also includes a controller that executes at least one of first control, where voltage at a first storage battery unit is made to be higher than voltage at a second storage battery unit regarding which prediction has been made that a degree of deterioration will be greater than the degree of deterioration of the first storage battery unit, and charging is stopped. The system further includes second control, where the adjusters are controlled and voltage at the first storage battery unit is made to be lower than voltage at the second storage battery unit, and discharging is stopped.

21 Claims, 24 Drawing Sheets

ELECTRICITY STORAGE SYSTEM AND CONTROL METHOD OF ELECTRICITY STORAGE SYSTEM

BACKGROUND

1. Technical Field

The present disclosure relates to an electricity storage system and the like that controls multiple storage battery units.

2. Description of the Related Art

Japanese Unexamined Patent Application Publication No. 2014-096918 is a technology relating to an electricity storage system where multiple storage cells are controlled. The control device is described in Japanese Unexamined Patent Application Publication No. 2014-096918 as performing cell balancing or module balancing. However, there are cases where cell balancing or module balancing is not appropriate for control of multiple storage battery units.

SUMMARY

One non-limiting and exemplary embodiment provides an electricity storage system capable of appropriately controlling multiple storage battery units.

In one general aspect, the techniques disclosed here feature a system including: a first circuit that serially connect storage battery units; second circuits that are connected in parallel to storage battery units, corresponding to each of the storage battery units; adjusters that adjust an amount of current flowing at the second circuits; and a controller that executes at least one of first control where, in charging of storage battery units through the first circuit, the controller causes the adjusters to make a voltage at a first storage battery unit out of the plurality of storage battery units higher than voltage at a second storage battery unit out of the plurality of storage battery units regarding which prediction has been made that a degree of deterioration will be greater than the degree of deterioration of the first storage battery unit by adjusting the amount of current flowing at the second circuits, and then stops charging, and second control where, in discharging of storage battery units through the first circuit, the controller causes the adjusters to make voltage at the first storage battery unit is set to be lower than voltage at the second storage battery unit by adjusting the amount of current flowing at the second circuits, and then stop discharging.

According to the electricity storage system according to an embodiment of the present disclosure, multiple storage battery units can be appropriately controlled.

It should be noted that general or specific embodiments may be implemented as a system, a device, a method, an integrated circuit, a computer program, a computer-readable non-transient recording medium such as a CD-ROM or the like, or may be realized as any selective combination of system, device, method, integrated circuit, computer program and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
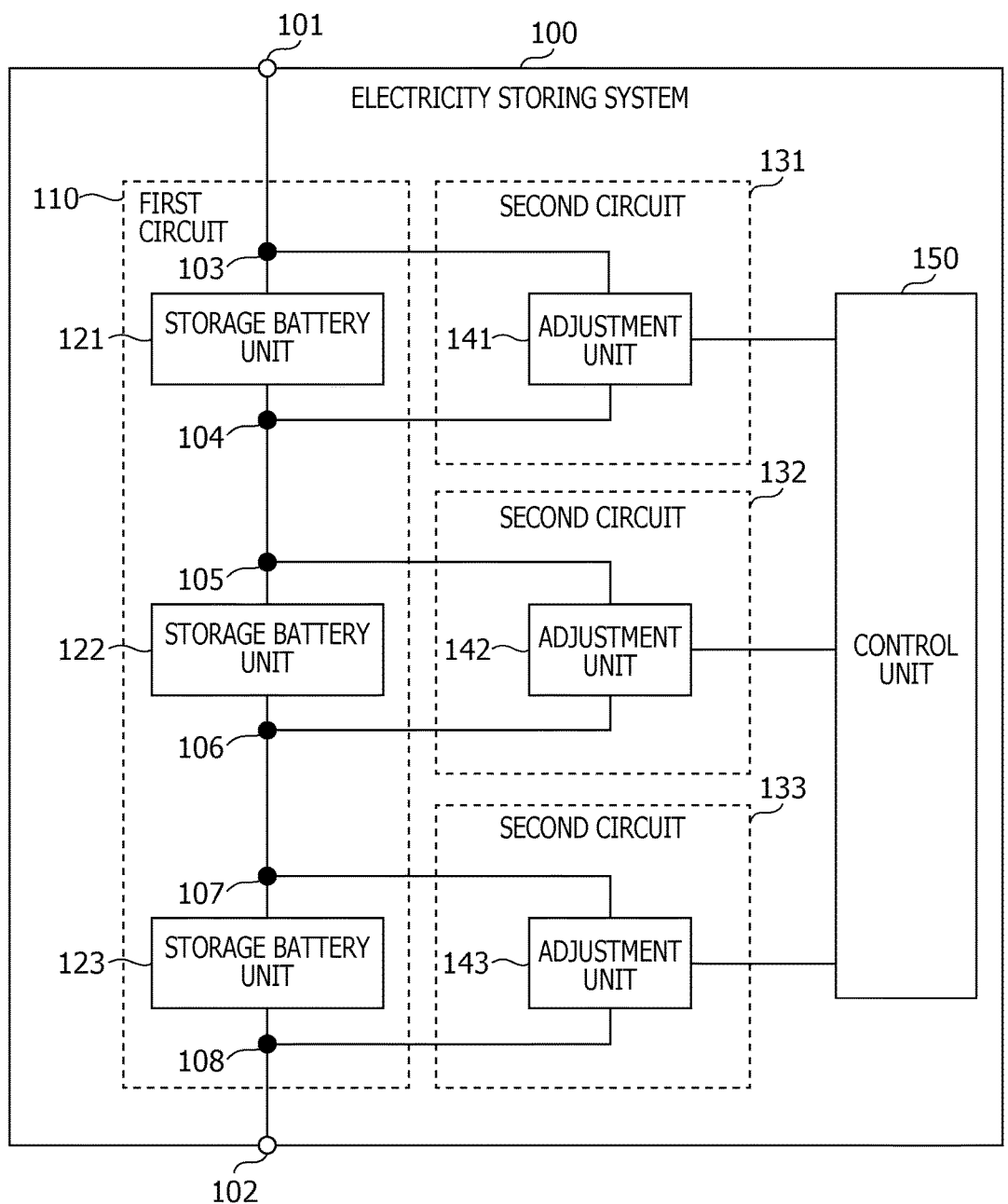
FIG. 1 is a block diagram illustrating the configuration of an electricity storage system according to a first embodiment.

Underlying Knowledge Forming Basis of the Present Disclosure

The present inventor has found problems with electricity storage systems that control multiple storage battery units. This will be described below in detail.

As of recent, there has been proposed a technology where the load on multiple storage battery units connected serially is averaged by performing charging and discharging while keeping the remaining capacity of the multiple storage battery units uniform. This sort of technology is called cell balancing or modular balancing. This sort of technology enables the capacity of the multiple storage battery units connected serially to be used efficiently in charging and discharging. Averaged dispersion of load is hoped to suppress locally advancing deterioration in multiple storage battery units.

However, averaged dispersion of load does not necessarily suppress locally advancing deterioration. For example, there are cases where there is a storage battery unit in the multiple storage battery unit where deterioration easily advances, depending on the connection arrangement of the multiple storage battery units, the layout of the multiple storage battery units, or the like. Deterioration may locally advance in the multiple storage battery units in such a case, even if averaged charging or discharge is performed regarding the multiple storage battery units.

Accordingly, there is a possibility that technology such as cell balancing or modular balancing will not yield the effects of longevity of the multiple storage battery units. Further, there is a possibility that, even in a case where there is no difference in the degree of deterioration among storage battery units at the initial point of using the storage battery system, difference in degree of deterioration may occur in the future, as the storage battery system continues to be used.

A system according to an aspect of the present disclose includes: a first circuit that serially connects storage battery units; second circuits that are connected in parallel to storage battery units, corresponding to each of the storage battery units; adjusters that adjust an amount of current flowing at the second circuits; and a controller that executes at least one of first control where, in charging of storage battery units through the first circuit, the controller causes the adjusters to make a voltage at a first storage battery unit out of the plurality of storage battery units higher than voltage at a second storage battery unit of storage battery units regarding which prediction has been made that a degree of deterioration will be greater than the degree of deterioration of the first storage battery unit by adjusting the amount of current flowing at the second circuits, and then stop charging, and second control where, in discharging of the plurality of storage battery units through the first circuit, the controller causes the adjusters to make voltage at the first storage battery unit lower than voltage at the second storage battery unit by adjusting the amount of current flowing at the second circuits, and then stop discharging.

Accordingly, advance in deterioration of a storage battery unit regarding which prediction is made that the degree of deterioration will be greater than other storage battery units is suppressed, and difference in the degree of deterioration does not readily occur among the storage battery units. Thus, the electricity storage system is capable of suppressing local advance in deterioration in multiple storage battery units, and can extend the longevity of the multiple storage battery units as a whole. That is to say, the electricity storage system can appropriately control multiple storage battery units. Note that the storage battery units may be any of single cells, battery blocks having multiple single cells, and battery modules having multiple battery blocks.

For example, the second circuits may be circuits where, in charging of storage battery units through the first circuit, current flows bypassing the storage battery units regarding which the second circuits are connected in parallel, and in the first control, the controller causes the adjusters to make the voltage of the first storage battery unit higher than the voltage of the second storage battery unit by making the current flowing at the second circuit connected in parallel to the first storage battery unit smaller than the current flowing at the second circuit connected in parallel to the second storage battery unit, and then stops charging.

Accordingly, charging of a storage battery unit regarding which prediction is made that the degree of deterioration will be great is suppressed, and advance in deterioration of that storage battery unit is suppressed. Thus, local advance in deterioration is suppressed.

For example, the second circuits may be circuits where, in charging of the plurality of storage battery units through the first circuit, discharge current of the storage battery units regarding which the second circuits are connected in parallel flows, and in the first control, the controller causes the adjusters to make the voltage of the first storage battery unit higher than the voltage of the second storage battery unit by making the current flowing at the second circuit connected in parallel to the first storage battery unit smaller than the current flowing at the second circuit connected in parallel to the second storage battery unit, and then stops charging.

Accordingly, control is effected so that a storage battery unit regarding which prediction is made that the degree of deterioration will be great is not fully charged, and advance in deterioration of that storage battery unit is suppressed. Thus, local advance in deterioration is suppressed.

For example, at the timing of at least one of before starting charging of the plurality of storage battery units through the first circuit and during interruption of charging thereof, the controller may cause the adjuster to make the voltage of the first storage battery unit higher than the voltage of the second storage battery unit by making the current flowing at the second circuit connected in parallel to the first storage battery unit smaller than the current flowing at the second circuit connected in parallel to the second storage battery unit.

Accordingly, control is effected so that discharge is executed at an appropriate timing, and a storage battery unit regarding which prediction is made that the degree of deterioration will be great is not fully charged.

For example, the second circuits may be circuits where, in discharging of storage battery units through the first circuit, current flows bypassing the storage battery units regarding which the second circuits are connected in parallel, and in the second control, the controller causes the adjusters to make the voltage of the first storage battery unit lower than the voltage of the second storage battery unit by making the current flowing at the second circuit connected in parallel to the first storage battery unit smaller than the current flowing at the second circuit connected in parallel to the second storage battery unit, and then stops discharging.

Accordingly, discharge of a storage battery unit regarding which prediction is made that the degree of deterioration will be great is suppressed, and advance in deterioration of that storage battery unit is suppressed. Thus, local advance in deterioration is suppressed.

For example, the second circuits may be circuits where, in discharging of the plurality of storage battery units through the first circuit, discharge current of the storage battery units regarding which the second circuits are connected in parallel flows, and in the second control, the controller causes the adjusters to make the voltage of the first storage battery unit lower than the voltage of the second storage battery unit by making the current flowing at the second circuit connected in parallel to the first storage battery unit greater than the current flowing at the second circuit connected in parallel to the second storage battery unit, and then stops discharging.

Accordingly, control is effected so that a storage battery unit regarding which prediction is made that the degree of deterioration will be great does not become empty first, and advance in deterioration of that storage battery unit is suppressed. Thus, local advance in deterioration is suppressed.

For example, at the timing of at least one of before starting discharging of the plurality of storage battery units through the first circuit and during interruption of discharging thereof, the controller may cause the adjuster to make the voltage of the first storage battery unit higher than the voltage of the second storage battery unit by making the current flowing at the second circuit connected in parallel to the first storage battery unit higher than the current flowing at the second circuit connected in parallel to the second storage battery unit.

Accordingly, control is effected so that discharge is executed at an appropriate timing, and a storage battery unit regarding which prediction is made that the degree of deterioration will be great is not fully charged.

For example, in the first control, the controller may raise the voltage of the first storage battery unit to a charging end voltage, raise the voltage of the second storage battery unit to a voltage lower than the charging end voltage, and then stop charging.

Accordingly, charging stops before a storage battery unit regarding which prediction is made that the degree of deterioration will be great is fully charged. Thus, advance in deterioration of the storage battery unit regarding which prediction is made that the degree of deterioration will be great is suppressed.

For example, in the second control, the controller may lower the voltage of the first storage battery unit to a discharging end voltage, lower the voltage of the second storage battery unit to a voltage higher than the discharging end voltage, and then stop discharging.

Accordingly, discharging stops before a storage battery unit regarding which prediction is made that the degree of deterioration will be great is empty. Thus, advance in deterioration of the storage battery unit regarding which prediction is made that the degree of deterioration will be great is suppressed.

For example, in charging of the plurality of storage battery units through the first circuit, the controller may not execute the first control but execute charging of the plurality of storage battery units through the first circuit, and then execute the first control.

Accordingly, unnecessary adjustment is suppressed during charging. Thus, loss of energy during charging is suppressed.

For example, in discharging of the plurality of storage battery units through the first circuit, the controller may not execute the second control but execute discharging of the plurality of storage battery units through the first circuit, and then execute the second control.

Accordingly, unnecessary adjustment is suppressed during discharging. Thus, loss of energy during discharging is suppressed.

For example, the first storage battery unit may be a storage battery unit regarding which prediction is made that the degree of deterioration will be the smallest out of storage battery units.

Accordingly, advance in deterioration of storage battery units other than a storage battery unit regarding which prediction is made that the degree of deterioration will be smallest is suppressed. That is to say, advance in deterioration of a storage battery unit regarding which prediction is made that the degree of deterioration will be relatively great is suppressed. Thus, advance in local deterioration is suppressed. Note that the storage battery units may be either single cells, or battery blocks having multiple single cells.

For example, the second storage battery unit may be a storage battery unit regarding which prediction is made that the degree of deterioration will be the greatest out of storage battery units.

Accordingly, advance in deterioration of a storage battery unit regarding which prediction is made that the degree of deterioration will be relatively great is suppressed. Thus, advance in local deterioration is suppressed. Note that the storage battery units may be either single cells, or battery blocks having multiple single cells.

For example, each of the plurality of storage battery units may include storage batteries. The first storage battery unit may be a storage battery unit including a storage battery regarding which prediction is made that the degree of deterioration will be the smallest in a group of storage batteries made up of a storage battery in each of storage battery units regarding which prediction is made that the degree of deterioration will be the greatest in each storage battery unit.

Accordingly, advance of deterioration is suppressed in storage battery units other than a storage battery unit including a storage battery regarding which prediction is made that the degree of deterioration will be the smallest in a group of storage batteries made up of a storage battery in each of the plurality storage battery units regarding which prediction is made that the degree of deterioration will be the greatest in each storage battery unit. That is to say, advance of deterioration is suppressed in a storage battery unit including a storage battery regarding which prediction is made that the degree of deterioration will be the greatest in a group of storage batteries made up of a storage battery in each of storage battery units regarding which prediction is made that the degree of deterioration will be the greatest in each storage battery unit. Thus, advance in local deterioration is suppressed. Note that the storage battery units may be either single cells, or battery blocks having multiple single cells.

For example, each of storage battery units may include storage batteries. The second storage battery unit may be a storage battery unit including a storage battery regarding which prediction is made that the degree of deterioration will be the greatest in a group of storage batteries made up of a storage battery in each of the plurality storage battery units regarding which prediction is made that the degree of deterioration will be the greatest in each storage battery unit.

Accordingly, advance in deterioration of a storage battery unit regarding which prediction is made that the greatest degree of deterioration will be greatest is suppressed. Thus, advance in local deterioration is suppressed. Note that the storage battery units may be any of single cells, battery blocks having multiple single cells. The storage battery unit including multiple storage cells may be either a battery block or a battery module.

For example, the electricity storage system may further include detector that detect a state function of each of the plurality of storage battery units. The controller may cause the adjusters to stop current flowing at the second circuits, and predict advance of degree of deterioration of the storage battery units based on a state function detected by the detection units while the current flowing at the second circuits is stopped.

Accordingly, the state function can be appropriately detected without being affected by adjustment. Thus, advance in the degree of deterioration can be appropriately detected.

According to another aspect of the present disclosure, a method includes executing at least one of first control and second control. The first control includes, in charging of a plurality of storage battery units that are serially connected, (a) making a voltage at a first storage battery unit out of the plurality of storage battery units higher than voltage at a second storage battery unit out of the plurality of storage battery units regarding which prediction has been made that a degree of deterioration will be greater than the degree of deterioration of the first storage battery unit by adjusting the amount of current flowing at circuits that are connected in parallel as to each of the plurality of storage battery units, and (b) then stopping charging of the plurality of storage battery units in a state where the voltage of the first storage battery unit is higher than the voltage of the second storage battery unit. The second control includes, in discharging of the plurality of storage battery units, (c) making voltage at the first storage battery unit is set to be lower than voltage at the second storage battery unit by adjusting the amount of current flowing at the circuits that are connected in parallel as to each of the plurality of storage battery units, and (d) then stopping discharging of the plurality of storage battery units in a state where the voltage of the first storage battery unit is lower than the voltage of the second storage battery unit.

Accordingly, advance in deterioration of a storage battery unit regarding which prediction is made that the degree of deterioration will be greater than other storage battery units is suppressed, and difference in the degree of deterioration does not readily occur among the storage battery units. Thus, local advance in deterioration in multiple storage battery units is suppressed, and the longevity of the multiple storage battery units is extended as a whole. That is to say, multiple storage battery units can be appropriately controlled.

It should be noted that these general or specific embodiments may be implemented as a system, a device, a method, an integrated circuit, a computer program, a non-transient computer-readable transient storage medium such as a CD-ROM or the like, or may be realized as any selective combination of system, device, method, integrated circuit, computer program and recording medium.

Embodiments will be described below with reference to the drawings. It should be noted that each of the embodiments illustrated here is a general or specific exemplification of the present invention. Accordingly, values, shares, materials, components, placements and connection states of components, steps, and order of steps, and so forth, in the embodiments are only exemplary, and do not restrict the present disclosure. Components in the following embodiments, which are not included in an independent Claim indicating the highest concept, are described as being optional components.

It should also be noted that ordering numbers, such as "first", "second", "third", and so forth, may be added to, reordered among, and removed from components or the like. The term "charging/discharging" refers to at least one of charging and discharging. The terms "voltage", "current", "resistance", and "electric power" may respectively mean a voltage value indicating voltage, a current value indicating current, a resistance value indicating resistance, and an electric power value indicating electric power.

First Embodiment

FIG. 1 is a block diagram illustrating the configuration of an electricity storage system according to a first embodiment. The charging system 100 illustrated in FIG. 1 controls storage battery units 121, 122, and 123. The electricity storage system 100 may be configured as a single device or as multiple devices. The electricity storage system 100 also includes a first circuit 110, second circuits 131, 132, and 133, and a control unit 150.

The first circuit 110 is an example of a first circuit according to the present disclosure, and is an electric circuit where the storage battery units 121, 122, and 123 are serially connected. The first circuit 110 corresponds to a path from a terminal 101 of the electricity storage system 100 through the storage battery units 121, 122, and 123 and reaching a terminal 102 of the electricity storage system 100. One of the terminal 101 and terminal 102 is a positive terminal for electric power, and the other is a negative terminal for electric power.

Each of the storage battery units 121, 122, and 123 is an example of a storage battery unit according to the present disclosure, and is a component that stores electric energy. Note that each of the storage battery units 121, 122, and 123 may be a single cell, or may be a battery block having multiple single cells, or may be a battery module having multiple battery blocks. A single cell is also referred to simply as "storage battery" or "cell". A battery block is also referred to as a "storage battery block", where multiple single cells are connected by at least one of serial and parallel connection. A battery module is also referred to as a "storage battery module", "battery pack", or "storage battery pack" where multiple battery blocks are connected by at least one of serial and parallel connection.

Each of the second circuits 131, 132, and 133 is an electric circuit, and is an example of a second circuit according to the present disclosure. The second circuits 131, 132, and 133 are disposed in parallel to the storage battery units 121, 122, and 123. Specifically, the second circuit 131 is disposed in parallel with the storage battery unit 121, the second circuit 132 is disposed in parallel with the storage battery unit 122, and the second circuit 133 is disposed in parallel with the storage battery unit 123.

For example, the second circuit 131 corresponds to a path from a node 103 through an adjuster 141 to a node 104. The second circuit 132 corresponds to a path from a node 105 through an adjuster 142 to a node 106. The second circuit 133 corresponds to a path from a node 107 through an adjuster 143 to a node 108.

The adjusters 141, 142, and 143 adjust the amount of current flowing through the second circuits 131, 132, and 133. The adjusters 141, 142, and 143 are examples of electric circuits included in the second circuits 131, 132, and 133. Specifically, the adjuster 141 adjusts the amount of current flowing through the second circuit 131, the adjuster 142 adjusts the amount of current flowing through the second circuit 132, and the adjuster 143 adjusts the amount of current flowing through the second circuit 133.

Each of the adjusters 141, 142, and 143 may have resistors for adjusting the amount of current, switches, and so forth. Each of the adjusters 141, 142, and 143 basically adjust the amount of current under control of the control unit 150.

The control unit 150 controls adjustment performed by the adjusters 141, 142, and 143. That is to say, the control unit 150 adjusts the amount of current flowing through the second circuits 131, 132, and 133 by way of the adjusters 141, 142, and 143. The control unit 150 may also control charging/discharging of the storage battery units 121, 122, and 123 connected serially.

Any arrangement may be used for the control unit 150, as long as control functions can be realized, and may include a processor and storage storing a control program. The processor may be a microprocessor unit (MPU) or a central processing unit (CPU). The storage may be volatile memory or nonvolatile memory. The control unit 150 may be controlled as an independent controller that effects central control, or may be configured as multiple controllers that collaboratively perform decentralized control.

Note that the configuration illustrated in FIG. 1 is only exemplary. Although the number of the storage battery units 121, 122, and 123, the number of the second circuits 131, 132, and 133, and the number of the adjusters 141, 142, and 143 are three in this example, the number may be two each, or four or more each. The terminals 101 and 102, and the nodes 103 through 108 may be added, changed or removed, as appropriate, in accordance with change in the configuration. For example, if electric power is being generated and consumed within the electricity storage system 100, the terminals 101 and 102 may be omitted.

Figure 2:
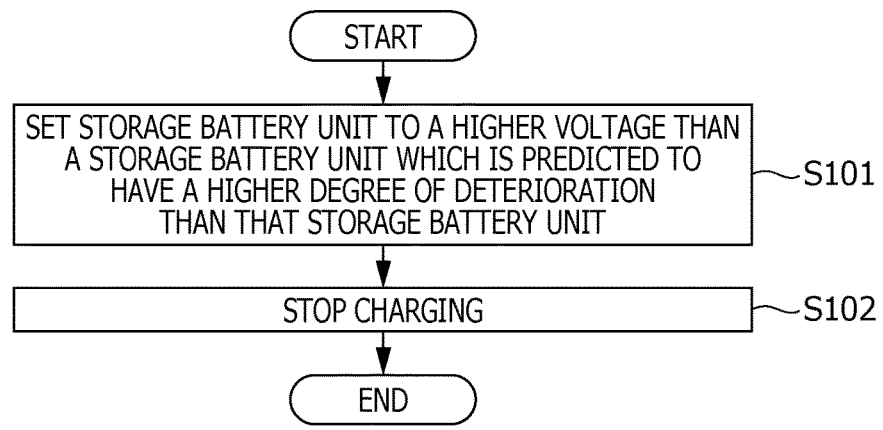
FIG. 2 is a flowchart illustrating the operations of the electricity storage system according to the first embodiment when charging.

FIG. 2 is a flowchart illustrating operations when charging with the electricity storage system 100 illustrated in FIG. 1. The operations illustrated in FIG. 2 are an example of first control according to the present disclosure. Description of the operations illustrated in FIG. 2 will be made below, with the understanding that prediction has been made that the degree of deterioration of the storage battery unit 121 will be greater than the degree of deterioration of the storage battery unit 122 in the future, although there currently is no difference in the degree of deterioration between the storage battery unit 121 and storage battery unit 122.

Advance in the degree of deterioration of a storage battery unit is predicted from the state function of the storage battery unit. Examples of state functions of a storage battery unit include temperature of the storage battery unit, output current, voltage, internal resistance, and so forth. For example, a storage battery deteriorates sue to high-voltage charging where charging is completed at high voltage, low-voltage discharge where discharge is continued to low voltage, low-temperature charging where charge is performed under cold temperature, high-temperature discharge, high-temperature charging, and so forth, so the advance in the degree of deterioration can be predict based on information indicating the temperature of the storage battery unit. The degree of deterioration of the storage battery unit also advances by repeating charging to high voltage and discharging to low voltage, so information indicating the voltage of the storage battery unit at the time of completing charging, and information indicating the voltage of the storage battery unit at the time of completing discharging, can be used to predict advance in the degree of deterioration of the storage battery unit. A specific method for prediction is the same here as that described in a second embodiment, so description will be omitted here. Although there is no description in the second embodiment regarding prediction of the degree of deterioration of storage battery blocks and storage battery modules, but the same prediction method for degree of deterioration can be applied even if the storage battery unit is a single cell.

Next, when charging the storage battery units 121, 122, and 123, the control unit 150 controls the adjusters 141, 142, and 143 so as to adjust the amount of current flowing through the second circuits 131, 132, and 133. The control unit 150 sets the voltage of the storage battery unit 122 so as to be higher than the voltage of the storage battery unit 121, since the storage battery unit 121 is predicted to exhibit greater deterioration than the storage battery unit 122 (S101). In this state where the voltage of the storage battery unit 122 is higher than the voltage of the storage battery unit 121, the control unit 150 stops charging of the storage battery units 121, 122, and 123 (S102).

Generally, it is assumed that charging each of the storage battery units 121, 122, and 123 at a higher voltage advances deterioration. It is assumed that charging each of the storage battery units 121, 122, and 123 until the voltage when charging is high, i.e., to a state where the remaining capacity is close to a full charge, leads to increase in the input/output amount, consequently advancing deterioration.

Accordingly, the voltage of the storage battery unit 122 is set so as to be higher than the voltage of the storage battery unit 121 that is predicted to exhibit greater deterioration than the storage battery unit 122, and charging is stopped, in the electricity storage system 100 according to the present embodiment as described above. This suppresses advance of deterioration of the storage battery unit 121 that is predicted to exhibit greater deterioration than the storage battery unit 122, and difference in the degree of deterioration between the storage battery unit 121 and storage battery unit 122 can be suppressed. Accordingly, the electricity storage system 100 can suppress local advance in deterioration in the storage battery units 121, 122, and 123, and the storage battery units 121, 122, and 123 can be appropriately controlled.

Figure 3:
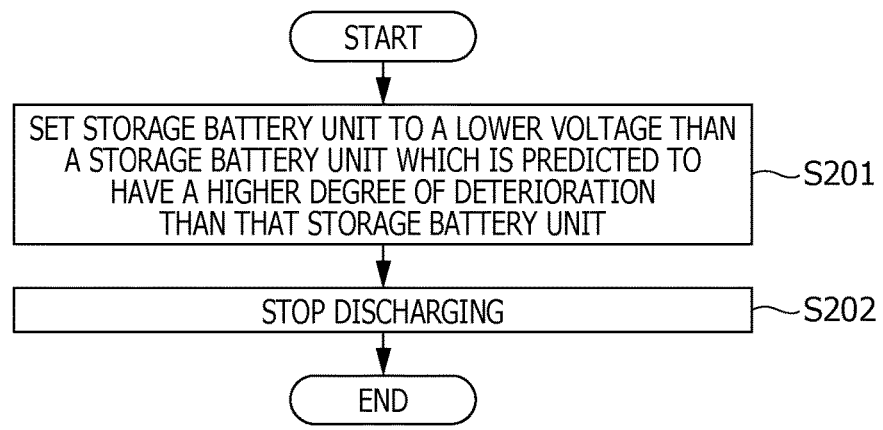
FIG. 3 is a flowchart illustrating the operations of the electricity storage system according to the first embodiment when discharging.

FIG. 3 is a flowchart illustrating operations when discharging with the electricity storage system 100 illustrated in FIG. 1. The operations illustrated in FIG. 3 are an example of second control according to the present disclosure. Description of the operations illustrated in FIG. 3 will be made below, with the understanding that prediction has been made that the degree of deterioration of the storage battery unit 121 will be greater than the degree of deterioration of the storage battery unit 122 in the future, although there currently is no difference in the degree of deterioration between the storage battery unit 121 and storage battery unit 122. Note that the prediction method of the degree of deterioration of the storage battery units is the same as that described above in the charging operations.

First, when discharging the storage battery units 121, 122, and 123, the control unit 150 controls the adjusters 141, 142, and 143 so as to adjust the amount of current flowing through the second circuits 131, 132, and 133. The control unit 150 sets the voltage of the storage battery unit 122 so as to be lower than the voltage of the storage battery unit 121, since the storage battery unit 121 is predicted to exhibit greater deterioration than the storage battery unit 122

(S201). In this state where the voltage of the storage battery unit 122 is lower than the voltage of the storage battery unit 121, the control unit 150 stops discharging of the storage battery units 121, 122, and 123 (S202).

Generally, it is assumed that discharging each of the storage battery units 121, 122, and 123 at a lower voltage advances deterioration. It is assumed that discharging each of the storage battery units 121, 122, and 123 until the voltage when discharging is low, i.e., to a state where the remaining capacity is close to empty capacity, leads to increase in the input/output amount, consequently advancing deterioration.

Accordingly, the voltage of the storage battery unit 122 is set so as to be lower than the voltage of the storage battery unit 121 that is predicted to exhibit greater deterioration than the storage battery unit 122, and discharging is stopped, in the electricity storage system 100 according to the present embodiment as described above. This suppresses advance of deterioration of the storage battery unit 121 that is predicted to exhibit greater deterioration than the storage battery unit 122, and difference in the degree of deterioration between the storage battery unit 121 and storage battery unit 122 can be suppressed. Accordingly, the electricity storage system 100 can suppress local advance in deterioration in the storage battery units 121, 122, and 123, and the overall lifespan of the storage battery units 121, 122, and 123 can be extended. That is to say, the storage battery units 121, 122, and 123 can be appropriately controlled.

Note that the electricity storage system 100 may perform just one of the operations illustrated in FIG. 2 and the operations illustrated in FIG. 3, or may perform both. For example, local advance of deterioration in the storage battery units 121, 122, and 123 can be suppressed by the electricity storage system 100 performing just one of these two operations.

Also, the second circuits 131, 132, and 133 may be circuits where a current that bypasses the storage battery units 121, 122, and 123 flows when charging the storage battery units 121, 122, and 123. The control unit 150 may effect control such that the current applied to the second circuit 132 connected in parallel to the storage battery unit 122 is set so as to be smaller than the current applied to the second circuit 131 connected in parallel to the storage battery unit 121 that is predicted to exhibit greater deterioration than the storage battery unit 122. This suppresses charging of the storage battery unit 121 that is predicted to exhibit greater deterioration, and advance of deterioration of the storage battery unit 121 is suppressed. Consequently, local advance of deterioration is suppressed.

Also, the second circuits 131, 132, and 133 may be circuits where a discharge current from the storage battery units 121, 122, and 123 flows when charging the storage battery units 121, 122, and 123. The control unit 150 may effect control such that the current applied to the second circuit 132 connected in parallel to the storage battery unit 122 is set so as to be smaller than the current applied to the second circuit 131 connected in parallel to the storage battery unit 121 that is predicted to exhibit greater deterioration than the storage battery unit 122. This suppresses charging of the storage battery unit 121 that is predicted to exhibit greater deterioration, and advance of deterioration of the storage battery unit 121 is suppressed. Consequently, local advance of deterioration is suppressed.

Also, the control unit 150 may set the discharge current flowing through the second circuit 132 so as to be smaller than the discharge current flowing through the second circuit 131, at the timing of at least one of before starting charging of the storage battery units 121, 122, and 123 and during interruption of charging thereof. Accordingly, discharge is executed at a suitable timing, and the storage battery unit 121 that is predicted to exhibit greater deterioration is controlled so as not to be fully charged.

The second circuits 131, 132, and 133 may also be circuits through which current bypassing the storage battery units 121, 122, and 123 flows, when discharging the storage battery units 121, 122, and 123. The control unit 150 may effect control such that the current flowing through the second circuit 132 connected in parallel to the storage battery unit 122 is set so as to be smaller than the current flowing through the second circuit 131 connected in parallel to the storage battery unit 121 that is predicted to exhibit greater deterioration than the storage battery unit 122. This suppresses discharging of the storage battery unit 121 that is predicted to exhibit greater deterioration, and advance of deterioration of the storage battery unit 121 is suppressed. Consequently, local advance of deterioration is suppressed.

The second circuits 131, 132, and 133 may also be circuits through which discharge current flows, when discharging the storage battery units 121, 122, and 123. The control unit 150 may effect control such that the current flowing through the second circuit 132 connected in parallel to the storage battery unit 122 is set so as to be greater than the current flowing through the second circuit 131 connected in parallel to the storage battery unit 121 that is predicted to exhibit greater deterioration than the storage battery unit 122. This effects control so that the storage battery unit 121 that is predicted to exhibit greater deterioration does not become empty first, and advance of deterioration of the storage battery unit 121 is suppressed. Consequently, local advance of deterioration is suppressed.

Also, the control unit 150 may set the discharge current flowing through the second circuit 132 so as to be greater than the discharge current flowing through the second circuit 131, at the timing of at least one of before starting charging of the storage battery units 121, 122, and 123 and during interruption of discharging thereof. Accordingly, discharge is executed at a suitable timing, and the storage battery unit 121 that is predicted to exhibit greater deterioration is controlled so as not to be empty.

Also, the control unit 150 may set the voltage of the storage battery unit 122 to a charging end voltage, set the voltage of the storage battery unit 121 that is predicted to exhibit greater deterioration than the storage battery unit 122 to a voltage lower than the charging end voltage, and stop charging. Accordingly, charging is stopped before the storage battery unit 121 that is predicted to exhibit greater deterioration is fully charged. Thus, advance in deterioration of the storage battery unit 121 that is predicted to exhibit greater deterioration is suppressed.

Also, the control unit 150 may set the voltage of the storage battery unit 122 to a discharging end voltage, set the voltage of the storage battery unit 121 that is predicted to exhibit greater deterioration than the storage battery unit 122 to a voltage higher than the discharging end voltage, and stop discharging. Accordingly, discharging is stopped before the storage battery unit 121 that is predicted to exhibit greater deterioration is empty. Thus, advance in deterioration of the storage battery unit 121 that is predicted to exhibit greater deterioration is suppressed.

Also, the control unit 150 may execute charging of the storage battery units 121, 122, and 123 without controlling the adjusters 141, 142, and 143 when charging the storage battery units 121, 122, and 123, and thereafter control the adjusters 141, 142, and 143. This suppresses unnecessary adjustment during charging. Accordingly, loss of energy when charging is suppressed.

Also, the control unit 150 may execute discharging of the storage battery units 121, 122, and 123 without controlling the adjusters 141, 142, and 143 when discharging the storage battery units 121, 122, and 123, and thereafter control the adjusters 141, 142, and 143. This suppresses unnecessary adjustment during discharging. Accordingly, loss of energy when discharging is suppressed.

Also, the storage battery unit 122, regarding which prediction is made that the degree of deterioration will be smaller than that of the storage battery unit 121, may be any storage battery unit out of the storage battery units 121, 122, and 123 regarding which prediction is made that the degree of deterioration will be the smallest. Also, the storage battery unit 121, regarding which prediction is made that the degree of deterioration will be greater than that of the storage battery unit 122, may be any storage battery unit out of the storage battery units 121, 122, and 123 regarding which prediction is made that the degree of deterioration will be the greatest.

Also, each of the storage battery units 121, 122, and 123 may include multiple storage batteries. The storage battery unit 122, regarding which prediction is made that the degree of deterioration will be smaller than that of the storage battery unit 121, may be a storage battery unit including a storage battery which is predicted to exhibit the smallest degree of deterioration in a group of storage batteries made up of a storage battery in each of the storage battery units 121, 122, and 123 regarding which is predicted to exhibit the greatest degree of deterioration in each storage battery unit. Also, the storage battery unit 121, regarding which prediction is made that the degree of deterioration will be greater than that of the storage battery unit 122, may be a storage battery unit including a storage battery which is predicted to exhibit the greatest degree of deterioration in a group of storage batteries made up of a storage battery in each of the storage battery units 121, 122, and 123 regarding which is predicted to exhibit the greatest degree of deterioration in each storage battery unit.

The electricity storage system 100 may further include a detector that detects the state function of each of the storage battery units 121, 122, and 123. The control unit 150 may stop current flowing to the second circuits 131, 132, and 133 by controlling the adjusters 141, 142, and 143. The control unit 150 may then predict advance of the degree of deterioration of the storage battery units 121, 122, and 123 from the state functions detected by the detector when current to the second circuits 131, 132, and 133 is stopped. Thus, the state functions can be appropriately detected without being affected by adjustment. Accordingly, advance of degree of deterioration can be appropriately predicted without being influenced by adjustment.

Second Embodiment

A second embodiment corresponds to a specific example of the first embodiment. Part of the configuration and part of the operations shown in the present embodiment may be combined with the configuration and operations shown in the first embodiment.

Figure 4:
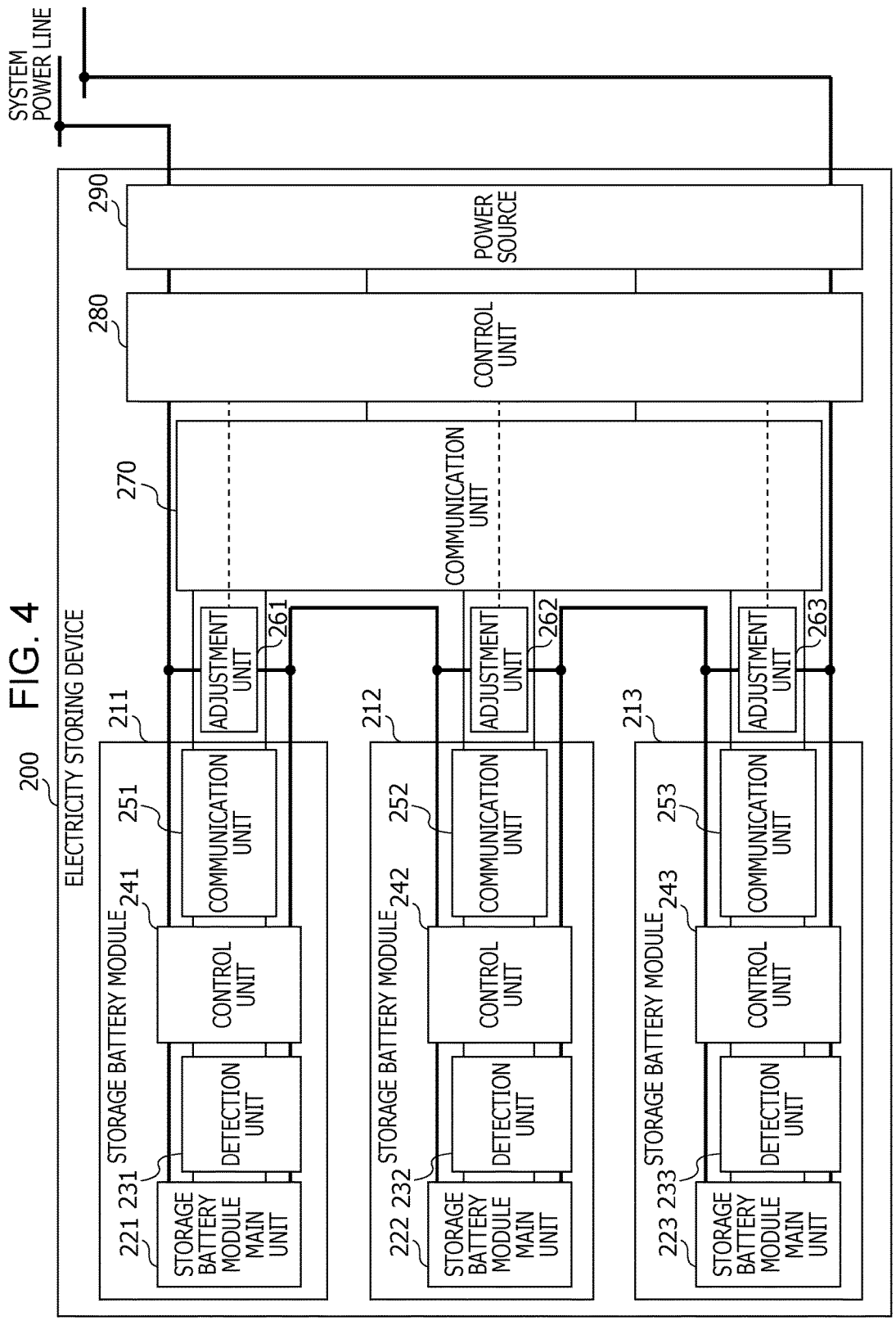
FIG. 4 is a block diagram illustrating the configuration of an electricity storage device according to a second embodiment.

FIG. 4 is a block diagram illustrating the configuration of the electricity storage device 200 according to the present embodiment. The heavy lines in FIG. 4 represent paths for transporting electric power, while the light lines and dotted lines between the components represent paths for conveying information. Multiple paths may be provided between the components for transmitting information, as indicated in FIG. 4. These paths may differ depending on the type of information, or may differ depending on the direction of transmission.

The electricity storage device 200 illustrated in FIG. 4 includes storage battery modules 211, 212, and 213, adjusters 261, 262, and 263, a communication unit 270, a control unit 280, and a power source 290. Note that the storage battery modules 211, 212, and 213 may be detachable from the electricity storage device 200, and the electricity storage device 200 does not need to have the storage battery modules 211, 212, and 213 as components.

For example, the electricity storage device 200 corresponds to the electricity storage system 100 according to the first embodiment. The storage battery modules 211, 212, and 213 are an example of the storage battery units 121, 122, and 123 according to the first embodiment. The adjusters 261, 262, and 263 correspond to the adjusters 141, 142, and 143 according to the first embodiment. The control unit 280 corresponds to the control unit 150 according to the first embodiment.

Paths passing through the storage battery modules 211, 212, and 213 correspond to the first circuit 110 according to the first embodiment. The path passing through the adjuster 261, the path passing through the adjuster 262, and the path passing through the adjuster 263, correspond to the second circuits 131, 132, and 133 according to the first embodiment.

The storage battery module 211 has a storage battery module main unit 221, a detection unit 231, a control unit 241, and a communication unit 251. The storage battery module 211 may also be referred to as a "battery module", "battery pack", or a "storage battery pack".

The storage battery module main unit 221 is a component for storing electric energy, and basically has multiple storage battery blocks. A storage battery block is also referred to as a "battery block".

The detection unit 231 detects the state function of the storage battery module main unit 221. For example, the detection unit 231 detects the temperature, charging voltage, discharging voltage, and internal resistance and the like of the storage battery module main unit 221. The detection unit 231 may detect the temperature, charging voltage, discharging voltage, and internal resistance and the like of each of multiple storage battery blocks in the storage battery module main unit 221. The detection unit 231 specifically may be a thermometer, or may be a voltmeter, or may be an ammeter.

Now, charging voltage is voltage at the time of charging, and discharging voltage is voltage at the time of discharging. Note that the charging voltage of storage batteries of the storage battery module main unit 221 may be simply be referred to as charging voltage of the storage battery module main unit 221, or as charging voltage of the storage battery module 211. In the same way, the discharging voltage of storage batteries of the storage battery module main unit 221 may be simply be referred to as discharging voltage of the storage battery module main unit 221, or as discharging voltage of the storage battery module 211.

The control unit 241 controls the operations of the overall storage battery module 211. For example, the control unit 241 may include a converter that controls charging or discharging of the storage battery module main unit 221. The control unit 241 may acquire a state function detected by the detection unit 231, and notify the control unit 280 via the communication units 251 and 270.

It is sufficient for the control unit 241 to have control functions. The control unit 241 may include a processor and storage for storing a control program. The processor may be an MPU or a CPU. The storage may be volatile memory or nonvolatile memory. The control unit 241 may be configured as an independent controller that effects central control, or may be configured as multiple controllers that collaboratively perform decentralized control.

The communication unit 251 is a component for the storage battery module 211 to perform communication. The communication unit 251 may include a communication interface. The communication unit 251 primarily is used for communication between the control unit 241 of the storage battery module 211 and the control unit 280 of the electricity storage device 200, and specifically communicates with the communication unit 270 of the electricity storage device 200.

The storage battery module 212 has a storage battery module main unit 222, a detection unit 232, a control unit 242, and a communication unit 252. The storage battery module 213 has a storage battery module main unit 223, a detection unit 233, a control unit 243, and a communication unit 253. It is sufficient for the control units 242 and 243 to have control functions. The control units 242 and 243 may each include a processor and storage for storing a control program. The processor may be a MPU or a CPU. The storage may be volatile memory or nonvolatile memory. The control unit 241 may be controlled as an independent controller that effects central control, or may be configured as multiple controllers that collaboratively perform decentralized control.

The storage battery modules 212 and 213, and the components thereof, are the same as the storage battery module 211 and the components thereof, but the storage battery modules 211, 212, and 213 may differ in the degree of deterioration depending on the usage state. Also, even of the degree of deterioration is the same among the storage battery modules 211, 212, and 213, this may change in the future. For example, even if there is no difference in degree of deterioration among the storage battery modules 211, 212, and 213 at the point of initial usage in the electricity storage device 200, there is a possibility that there may be difference in the future among the storage battery modules 211, 212, and 213 in the degree of deterioration as the electricity storage device 200 continues to be used.

The degree of deterioration means the degree at which deterioration advances. Specifically, the greater the degree of deterioration is, the further the deterioration has advanced. The degree of deterioration of the storage battery modules 211, 212, and 213 corresponds to the degree of deterioration of the storage battery module main units 221, 222, and 223.

More specifically, the degree of deterioration of the storage battery module 211 corresponds to the degree of deterioration of the storage battery block of which the deterioration has advanced farthest of the multiple storage battery blocks included in the storage battery module main unit 221. The degree of deterioration of the storage battery module 212 corresponds to the degree of deterioration of the storage battery block of which the deterioration has advanced farthest of the multiple storage battery blocks included in the storage battery module main unit 222. The degree of deterioration of the storage battery module 213 corresponds to the degree of deterioration of the storage battery block of which the deterioration has advanced farthest of the multiple storage battery blocks included in the storage battery module main unit 223.

For example, the storage battery module with the greatest degree of deterioration out of the storage battery modules 211, 212, and 213 includes a storage battery block having the greatest degree of deterioration in a group of storage battery blocks made up of the storage battery block in each of the storage battery modules 211, 212, and 213 regarding which the degree of deterioration is greatest in each storage battery module. Also, the storage battery module with the smallest degree of deterioration out of the storage battery modules 211, 212, and 213 includes a storage battery block having the smallest degree of deterioration in a group of storage battery blocks made up of the storage battery block in each of the storage battery modules 211, 212, and 213 regarding which the degree of deterioration is greatest in each storage battery module.

The future degree of deterioration is predicted in the present embodiment. The future degree of deterioration that is predicted may be referred to as "predicted degree of deterioration". The term "future" as used here means any point in time after the present. The predicted degree of deterioration of the storage battery modules 211, 212, and 213 corresponds to the predicted degree of deterioration of the storage battery module main units 221, 222, and 223.

More specifically, the predicted degree of deterioration of the storage battery module 211 corresponds to the predicted degree of deterioration of a storage battery block regarding which prediction is made that advance of deterioration will be greatest out of multiple storage battery blocks included in the storage battery module main unit 221. Also, the predicted degree of deterioration of the storage battery module 212 corresponds to the predicted degree of deterioration of a storage battery block regarding which prediction is made that advance of deterioration will be greatest out of multiple storage battery blocks included in the storage battery module main unit 222. Further, the predicted degree of deterioration of the storage battery module 213 corresponds to the predicted degree of deterioration of a storage battery block regarding which prediction is made that advance of deterioration will be greatest out of multiple storage battery blocks included in the storage battery module main unit 223.

For example, the storage battery module with the greatest predicted degree of deterioration in the storage battery modules 211, 212, and 213 includes a storage battery block having the greatest predicted degree of deterioration in a group of storage battery blocks made up of the storage battery block in each of the storage battery modules 211, 212, and 213 regarding which the predicted degree of deterioration is greatest in each storage battery module. Also, the storage battery module with the smallest predicted degree of deterioration in the storage battery modules 211, 212, and 213 includes a storage battery block having the smallest predicted degree of deterioration in a group of storage battery blocks made up of the storage battery block in each of the storage battery modules 211, 212, and 213 regarding which the predicted degree of deterioration is greatest in each storage battery module.

The adjuster 261 adjusts the amount of current flowing through the adjuster 261. The adjuster 261 may include a resistor for adjusting the amount of current, switches, and so forth. The adjuster 261 adjusts the amount of current under control of the control unit 280. The adjusters 262 and 263 have the same components as the adjuster 261.

The communication unit 270 is a component by which the electricity storage device 200 performs communication. The communication unit 270 may include a communication interface. The communication unit 270 primarily is used for communication between the control units 241, 242, and 243 of the storage battery modules 211, 212, and 213, and the control unit 280 of the electricity storage device 200. Specifically, the communication unit 270 communicates with the communication units 251, 252, and 253 of the storage battery modules 211, 212, and 213.

The control unit 280 controls the operations of the entire electricity storage device 200. For example, the control unit 280 controls adjustment performed by the adjusters 261, 262, and 263. The control unit 280 controls the amount of current flowing through the adjusters 261, 262, and 263 by controlling the adjustment of the adjusters 261, 262, and 263. The control unit 280 may control charging/discharging of the serially-connected storage battery modules 211, 212, and 213, and may control input/output of the power source 290.

The control unit 280 may include a processor and storage for storing a control program. The processor may be a MPU or a CPU. The storage may be volatile memory or nonvolatile memory. The control unit 280 may be controlled as an independent controller that effects central control, or may be configured as multiple controllers that collaboratively perform decentralized control.

The power source 290 is a component that supplies electric power. The power source 290 receives electric power from a system power line to be used for charging at the electricity storage device 200, and transmits electric power discharged from the electricity storage device 200 to the system power line. The power source 290 may include a bidirectional inverter that converts DC electric power corresponding to the storage battery modules 211, 212, and 213, into AC electric power corresponding to the system power line, and converts AC electric power corresponding to the system power line into DC electric power corresponding to the storage battery modules 211, 212, and 213.

As described above, the electricity storage device 200 has the adjusters 261, 262, and 263 in parallel to the storage battery modules 211, 212, and 213. The amount of current flowing through the adjusters 261, 262, and 263 differs depending on the predicted degree of deterioration of the storage battery modules 211, 212, and 213.

Specifically, the control unit 280 acquires the state functions detected by the detection units 231, 232, and 233, via the control units 241, 242, and 243, and the communication units 251, 252, 253, and 270, and predicts the future degree of deterioration based on the state functions. For example, the control unit 280 may acquire the current internal resistance as a state function, and predict that the greater the current internal resistance is, the greater the future degree of deterioration will be. The control unit 280 thus acquires the predicted degree of deterioration for each of the storage battery modules 211, 212, and 213.

In a case where there is no difference in degree of deterioration among the storage battery modules 211, 212, and 213, the control unit 280 adjusts the amount of current flowing through the adjusters 261, 262, and 263, so that the amount of charging/discharging is greater for a storage battery module in the storage battery modules 211, 212, and 213 where the predicted degree of deterioration is small in comparison with a storage battery module where the predicted degree of deterioration is great.

Note that the configuration illustrated in FIG. 4 is only exemplary. Although the number of the storage battery modules 211, 212, and 213 and the number of the adjusters 261, 262, and 263 are three in this example, the number may be two each, or four or more each.

Figure 5:
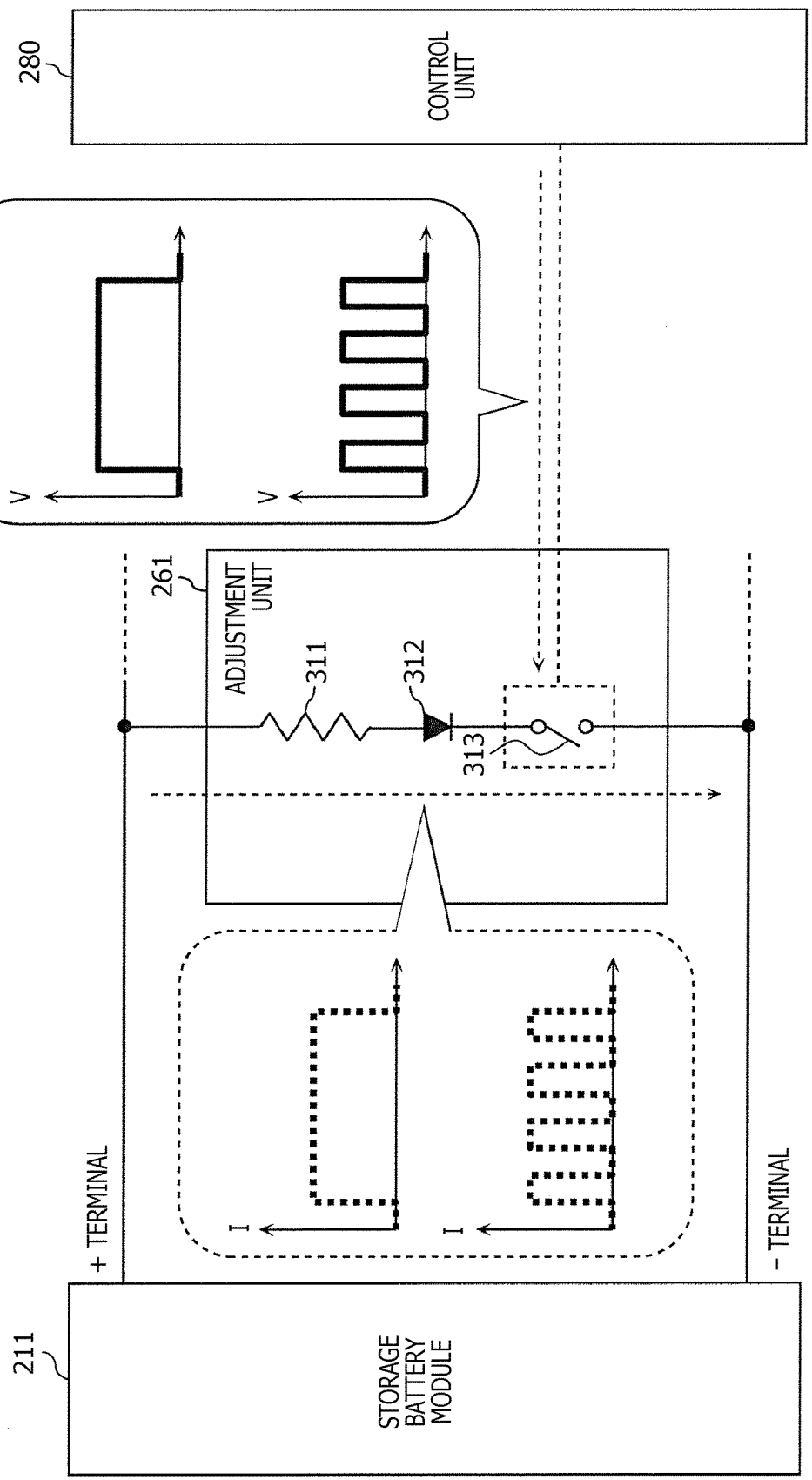
FIG. 5 is a schematic diagram illustrating the configuration of an adjuster according to the second embodiment.

FIG. 5 is a schematic diagram illustrating the configuration of the adjuster 261 illustrated in FIG. 4. The adjuster 261 includes, for example, a resistor 311, a diode 312, and a switch 313.

The resistor 311 is a component that provides electrical resistance, and resists the current flowing through the adjuster 261. The diode 312 is a rectifying component that restricts the direction of the current flowing through the adjuster 261. In this case, the diode 312 restricts the direction of the current to a direction from the positive side of the storage battery module 211 toward the negative side.

The switch 313 is a component to open and close the circuit. Specifically, the switch 313 switches between control where current flows through the adjuster 261 and control where current does not flow through the adjuster 261, under control of the control unit 280. The switch 313 may be a relay, or may be a field effect transistor (FET).

For example, the switch 313 switches between open and closed in accordance with voltage applied from the control unit 280. Specifically, the switch 313 closes the circuit when voltage is being applied, so that current flows through the adjuster 261. On the other hand, the switch 313 opens the circuit when voltage is not being applied, so that current does not flow through the adjuster 261. The control unit 280 can change the amount of current by changing the duty ratio in periods where voltage is applied, and thus adjust the amount of current.

The adjusters 262 and 263 may have a configuration equivalent to that of the adjuster 261 illustrated in FIG. 5. The control unit 280 can individually adjust the remaining capacity of the storage battery modules 211, 212, and 213 by adjusting the current flowing through the adjusters 261, 262, and 263.

Figure 6:
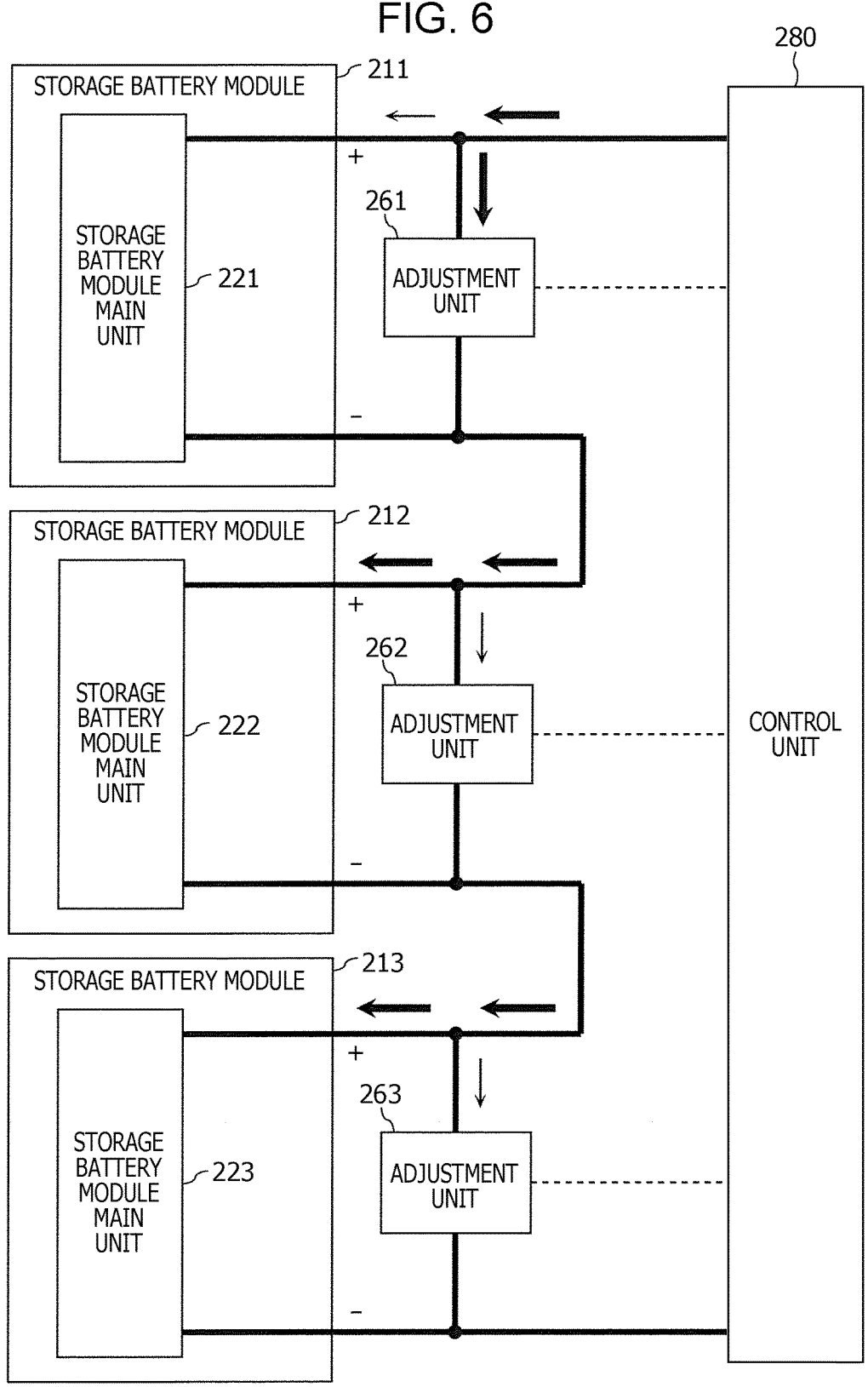
FIG. 6 is a schematic diagram illustrating the operations of an electricity storage device according to the second embodiment when charging.

FIG. 6 is a schematic diagram illustrating the operations of the electricity storage device 200 illustrated in FIG. 4, when charging. An assumption will be made regarding the example in FIG. 6 that in a state where there is no difference in the degree of deterioration among the storage battery modules 211, 212, and 213, the predicted degree of deterioration of the storage battery module 211 is the greatest. That is to say, in a state where there is no difference in the degree of deterioration among the storage battery modules 211, 212, and 213, prediction is made that the deterioration of the storage battery module 211 will advance most. The heaviness of the arrows in FIG. 6 corresponds to the magnitude of the amount of current. The heavier an arrow is, the greater the amount of current.

Figure 7:
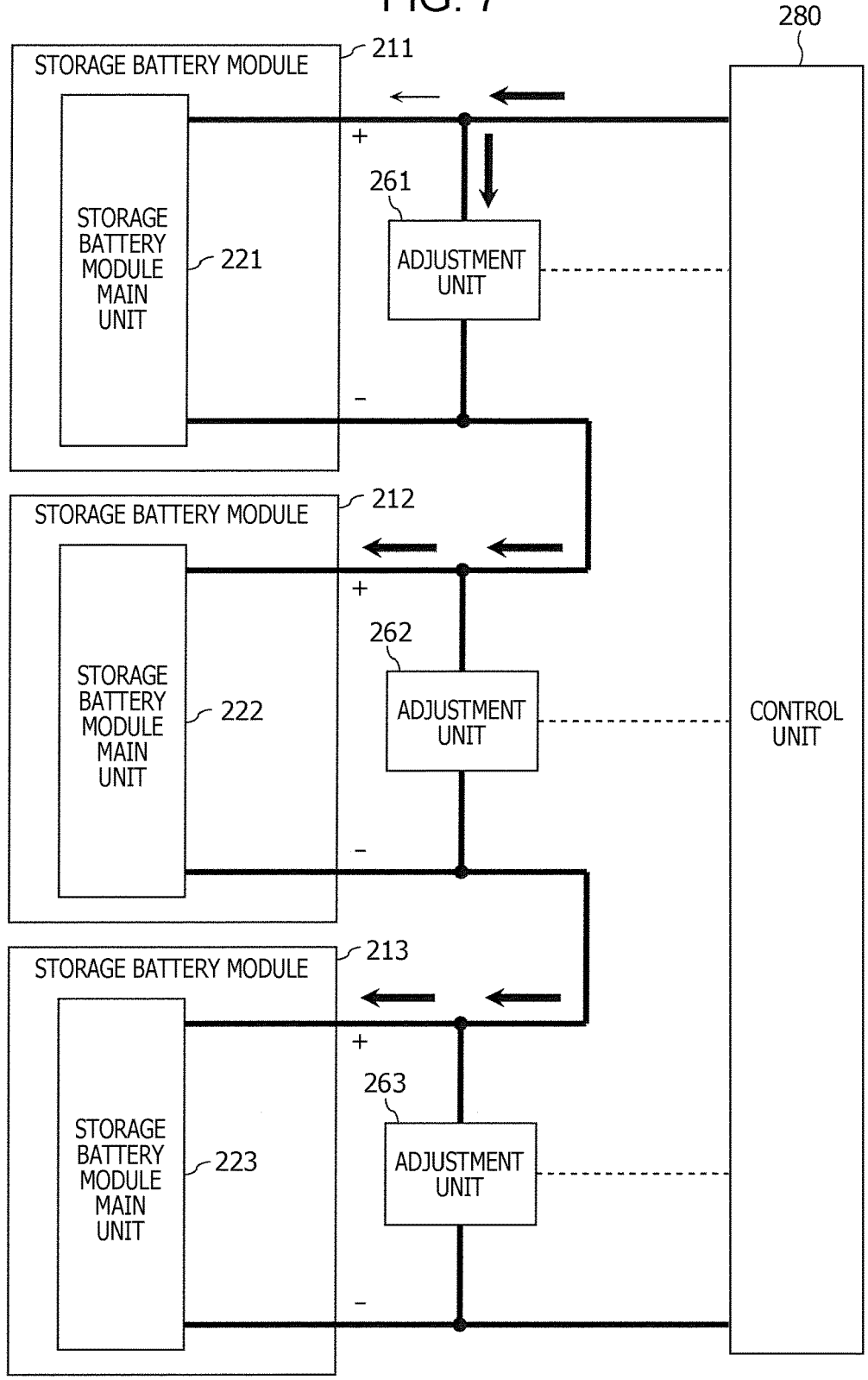
FIG. 7 is a schematic diagram illustrating another example of the operations of the electricity storage device according to the second embodiment when charging.

In a state where there is no difference in the degree of deterioration among the storage battery modules 211, 212, and 213, the control unit 280 in this example increases the amount of current flowing through the adjuster 261 connected in parallel to the storage battery module 211 of which the predicted degree of deterioration is the greatest. The control unit 280 also reduces the amount of current flowing through the adjusters 262 and 263. The control unit 280 may also control the adjusters 261, 262, and 263 so that current flows at the adjuster 261 but does not flow at the adjusters 262 and 263, as illustrated in FIG. 7.

Accordingly, the control unit 280 can increase the amount of current charged to each of the storage battery modules 212 and 213, and reduce the amount of current charged to the storage battery module 211. That is to say, when the electricity storage device 200 performs charging, the amount of usage of the storage battery module 211 that has the greatest predicted degree of deterioration out of the storage battery modules 211, 212, and 213 can be reduced.

Accordingly, the electricity storage device 200 can suppress advance in deterioration of the storage battery module 211 of which the predicted degree of deterioration is the greatest. The electricity storage device 200 thus can suppress advance in local deterioration in the storage battery modules 211, 212, and 213.

Note that in the example in FIG. 6, current bypassing the storage battery module 211 flows through the adjuster 261, current bypassing the storage battery module 212 flows through the adjuster 262, and current bypassing the storage battery module 213 flows through the adjuster 263. An arrangement may be made where, before starting charging or during interruption of charging, current discharged from the storage battery module 211 flows through the adjuster 261, current discharged from the storage battery module 212 flows through the adjuster 262, and current discharged from the storage battery module 213 flows through the adjuster 263. Accordingly, the remaining capacities of the storage battery modules 211, 212, and 213 are appropriately adjusted.

An arrangement may also be made where the amounts of current flowing through the adjusters 261, 262, and 263 are adjusted in accordance with the predicted degree of deterioration of the storage battery modules 211, 212, and 213. For example, an arrangement may be made where the amount of current flowing through the adjuster 261 corresponding to the storage battery module 211, of which the predicted degree of deterioration is greatest, is the largest, the amount of current flowing through the adjuster 263 corresponding to the storage battery module 213, of which the predicted degree of deterioration is next greatest, is next largest, and the amount of current flowing through the adjuster 262 corresponding to the storage battery module 212, of which the predicted degree of deterioration is smallest out of the storage battery modules 211, 212, and 213, is the smallest.

Figure 8:
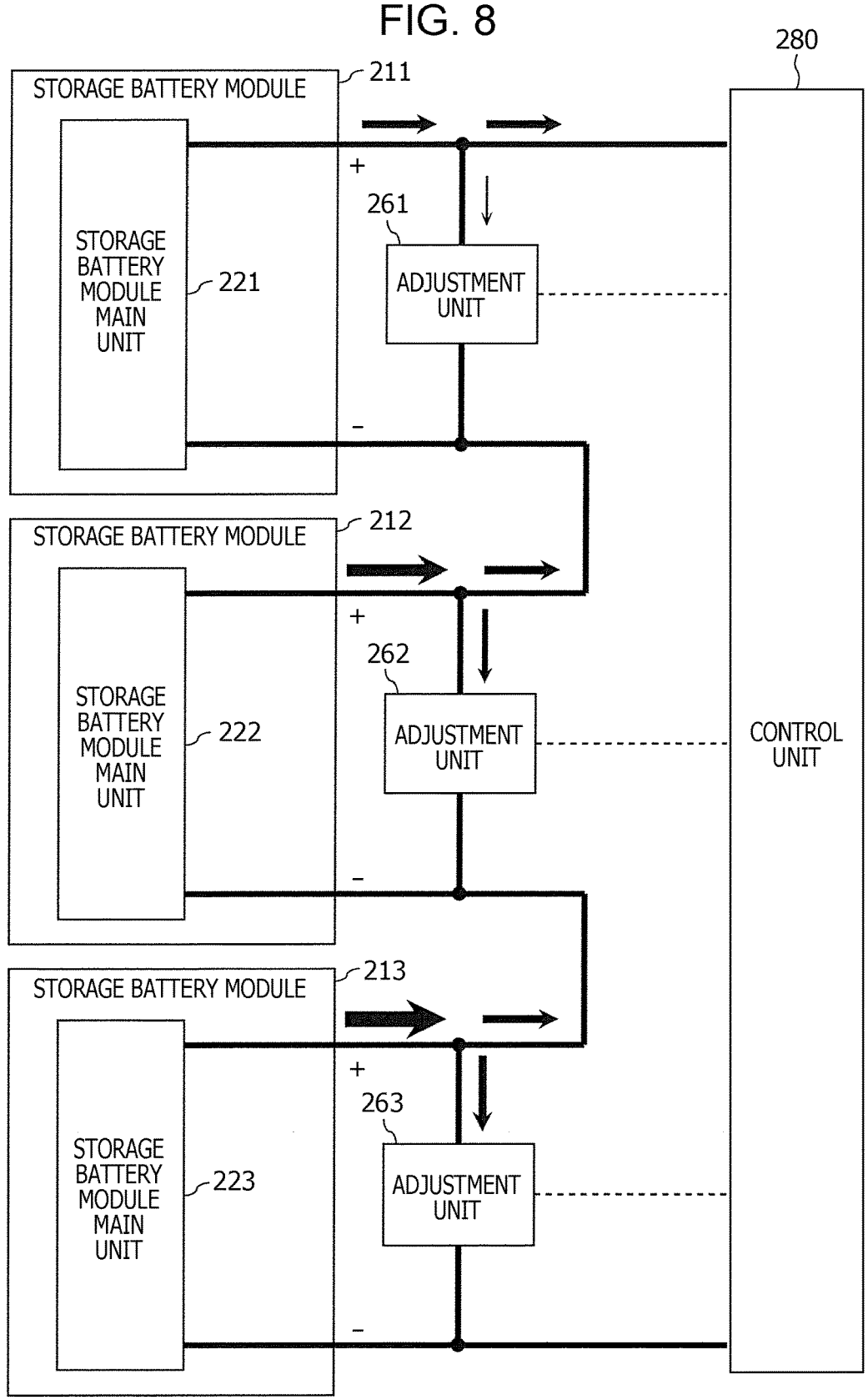
FIG. 8 is a schematic diagram illustrating the operations of the electricity storage device according to the second embodiment when discharging.

FIG. 8 is a schematic diagram illustrating the operations of the electricity storage device 200 illustrated in FIG. 4, when discharging. Assumption will be made that, in a state where there is no difference in the degree of deterioration among the storage battery modules 211, 212, and 213, the predicted degree of deterioration of the storage battery module 211 is the greatest in the example in FIG. 8, the same as the example in FIG. 6. That is to say, in a state where there is no difference in the degree of deterioration among the storage battery modules 211, 212, and 213, prediction is made that the deterioration of the storage battery module 211 will advance most. The heaviness of the arrows in FIG. 8 corresponds to the magnitude of the amount of current, the same as the example in FIG. 6. The heavier an arrow is, the greater the amount of current.

In a state where there is no difference in the degree of deterioration among the storage battery modules 211, 212, and 213, the control unit 280 in this example decreases the amount of current flowing through the adjuster 261 connected in parallel to the storage battery module 211 of which the predicted degree of deterioration is the greatest. The control unit 280 also increases the amount of current flowing through the adjusters 262 and 263. The control unit 280 may also control the adjusters 261, 262, and 263 so that current flows at the adjusters 262 and 263 but does not flow at the adjuster 261.

The current flowing through the adjusters 261, 262, and 263 is current discharged from the storage battery modules 211, 212, and 213, and is consumed at the adjusters 261, 262, and 263. The greater the amount of current flowing through the adjusters 261, 262, and 263 is, the greater the current amount discharged from the storage battery modules 211, 212, and 213 is.

In this case, the amount of current flowing through the adjusters 262 and 263 is greater than the adjuster 261, so the amount of current discharged from the storage battery modules 212 and 213 is greater than the storage battery module 211. Conversely, the amount of current flowing through the adjuster 261 is smaller than the adjusters 262 and 263, so the amount of current discharged from the storage battery module 211 is smaller than the storage battery modules 212 and 213.

That is to say, the control unit 280 can increase the amount of current discharged from each of the storage battery modules 212 and 213 by increasing the amount of current flowing through the adjusters 262 and 263. The control unit 280 also can reduce the amount of current discharged from the storage battery module 211 by reducing the amount of current flowing through the adjuster 261. Accordingly, when discharging, the electricity storage device 200 can make the amount of usage of the storage battery module 211 that has the greatest predicted degree of deterioration out of the storage battery modules 211, 212, and 213, to be relatively small.

Accordingly, the electricity storage device 200 can suppress advance of deterioration of the storage battery module 211 that has the greatest predicted degree of deterioration, as compared to the storage battery modules 212 and 213. The electricity storage device 200 can thus suppress local advance of deterioration in the storage battery modules 211, 212, and 213.

Note that the control unit 280 may control the adjusters 261, 262, and 263 before starting discharging or during interruption of discharging to the outside from the electricity storage device 200, so that current discharged from the storage battery modules 211, 212, and 213 flow through the adjusters 261, 262, and 263. That is to say, discharge for internal adjustment in the electricity storage device 200 may be performed before starting discharging or during interruption of discharging to the outside from the electricity storage device 200.

The amount of current flowing through the adjusters 261, 262, and 263 may be adjusted in accordance with the predicted degree of deterioration of the storage battery modules 211, 212, and 213. For example, an arrangement may be made where the amount of current flowing through the adjuster 261 corresponding to the storage battery module 211, of which the predicted degree of deterioration is the greatest, is the smallest, the amount of current flowing through the adjuster 263 corresponding to the storage battery module 213, of which the predicted degree of deterioration is next greatest, is next smallest, and the amount of current flowing through the adjuster 262 corresponding to the storage battery module 212, of which the predicted degree of deterioration is smallest out of the storage battery modules 211, 212, and 213, is the largest.

Figure 9:
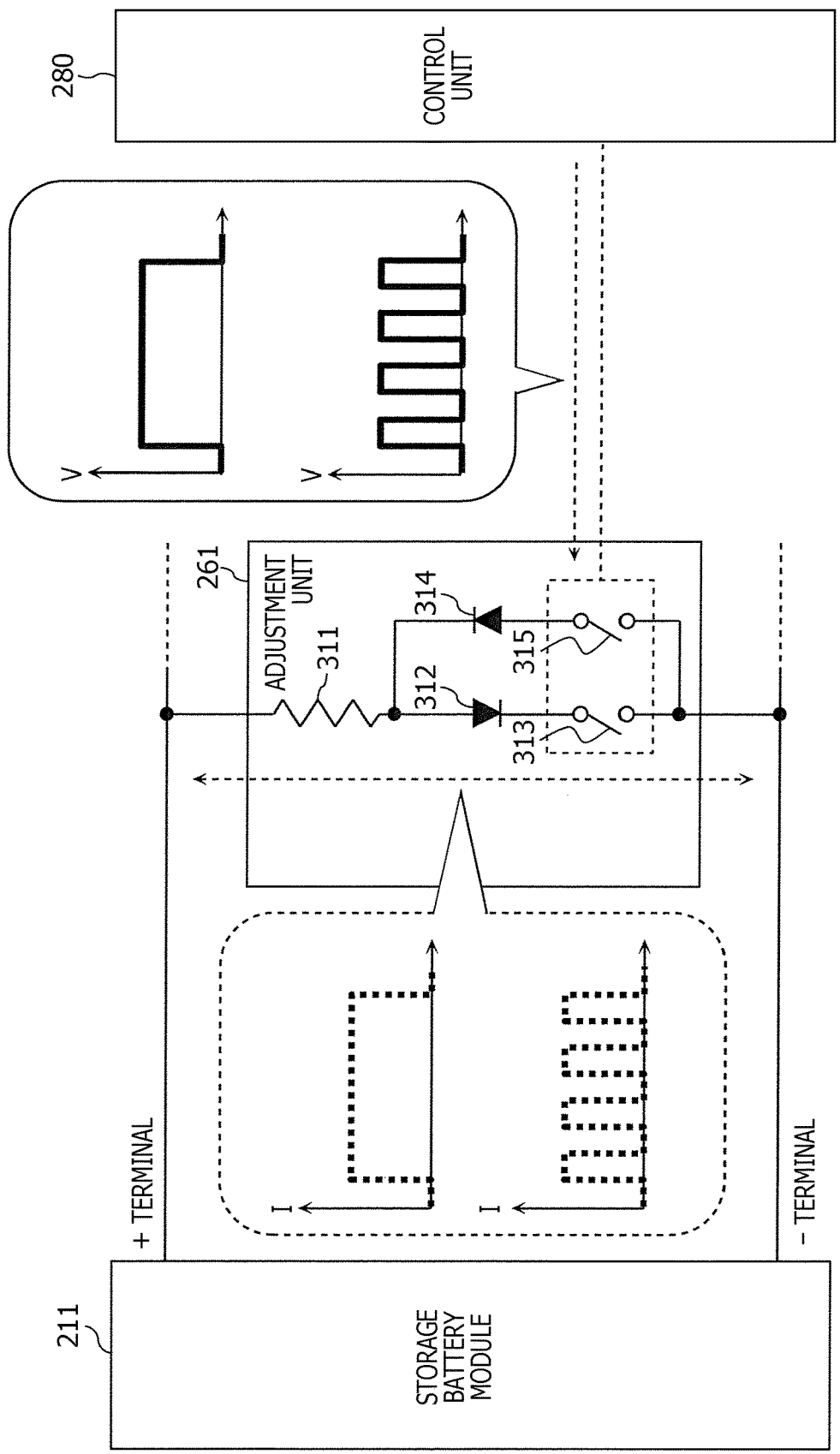
FIG. 9 is a schematic diagram illustrating another example of the configuration of the adjuster according to the second embodiment.

FIG. 9 is a schematic diagram illustrating another example of the configuration of the adjuster 261 illustrated in FIG. 4. The adjuster 261 may include the resistor 311, the diode 312, the switch 313, a diode 314, and a switch 315, as illustrated in FIG. 9. The diode 314 and switch 315 have been added to the example in FIG. 9, as compared to the example in FIG. 5. Specifically, the diode 314 and the switch 315 have been disposed in parallel to the diode 312 and switch 313.

The diode 314 is a rectifying component that restricts the direction of the current flowing through the adjuster 261, in the same way as the diode 312. In this case, the diode 314 restricts the direction of the current to a direction from the negative side of the storage battery module 211 toward the positive side.

The switch 315 is a component to open and close the circuit, in the same way as the switch 313. Specifically, the switch 315 switches between control where current flows through the adjuster 261 and control where current does not flow through the adjuster 261, under control of the control unit 280. The switch 315 may be a relay, or may be an FET.

For example, the switch 315 switches between open and closed in accordance with voltage applied from the control unit 280, in the same way as the switch 313. Specifically, the switch 315 closes the circuit when voltage is being applied, so that current flows through the adjuster 261. On the other hand, the switch 315 opens the circuit when voltage is being applied, so that current does not flow through the adjuster 261. The control unit 280 can change the amount of current by changing the duty ratio in periods where voltage is applied, and thus adjust the amount of current.

A voltage value to switch the switch 313 on, a voltage value to switch the switch 315 on, and a voltage value to switch both the switches 313 and 315 on, may differ from each other. Thus, the control unit 280 can individually switch the switches 313 and 315 on and off.

Alternatively, a path between the control unit 280 and the switch 313 and a path between the control unit 280 and the switch 315 may be provided separate from each other. Accordingly, the control unit 280 can individually switch the switches 313 and 315 on and off.

The adjusters 262 and 263 may have a configuration equivalent to that of the adjuster 261 illustrated in FIG. 9. Thus, the control unit 280 can appropriately adjust the currents flowing in both directions at the adjusters 261, 262, and 263.

Figure 10:
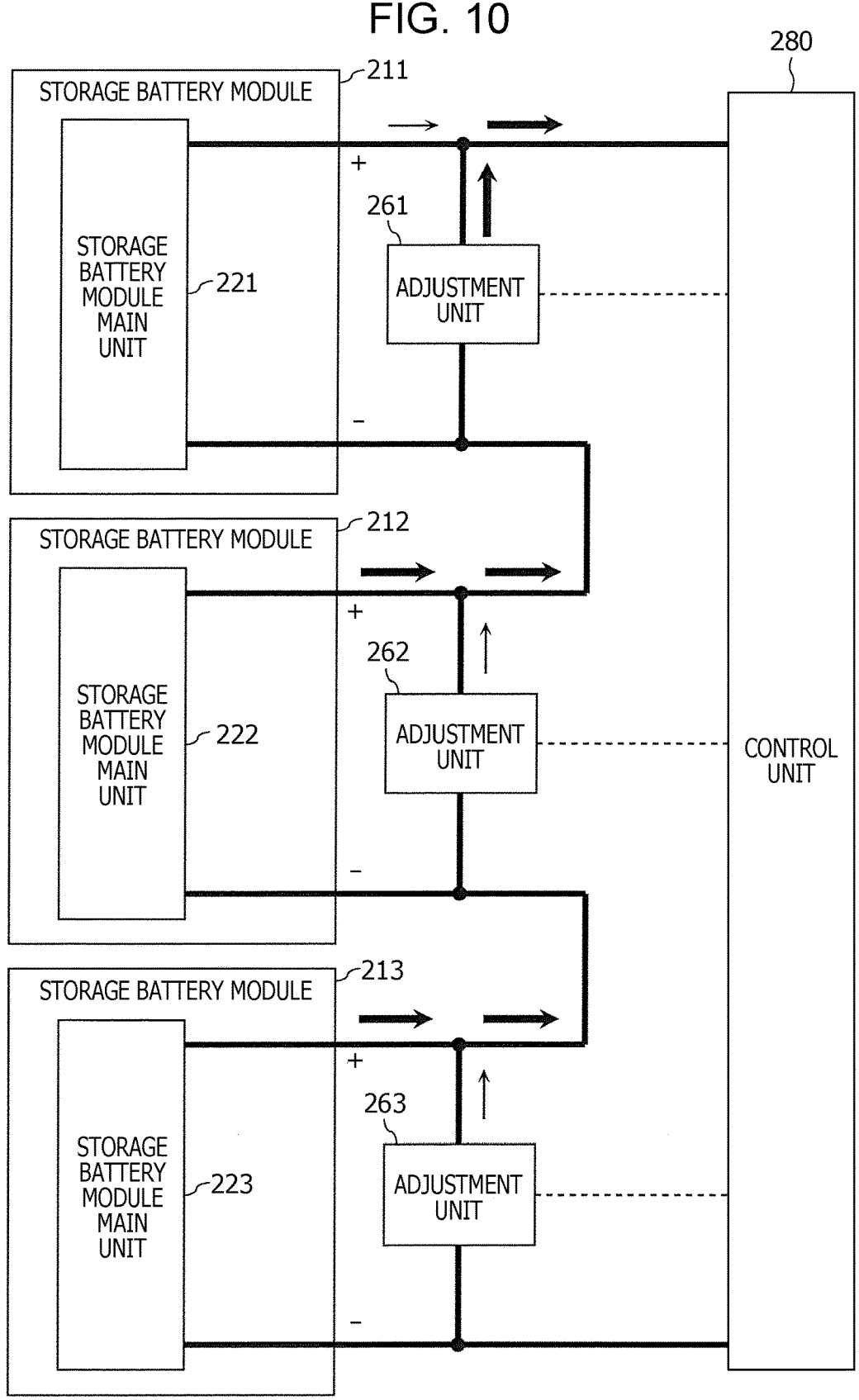
FIG. 10 is a schematic diagram illustrating another example of the operations of the electricity storage device according to the second embodiment when discharging.

FIG. 10 is a schematic diagram illustrating another example of the operations of the electricity storage device 200 illustrated in FIG. 4, when discharging. This example uses the adjuster 261 illustrated in FIG. 9, and uses the adjusters 262 and 263 that have the same configuration as the adjuster 261 illustrated in FIG. 9. Further, in this example, assumption will be made that in a state where there is no difference in the degree of deterioration among the storage battery modules 211, 212, and 213, the predicted degree of deterioration of the storage battery module 211 is the greatest, the same as in the example in FIG. 8. That is to say, in a state where there is no difference in the degree of deterioration among the storage battery modules 211, 212, and 213, prediction is made that the deterioration of the storage battery module 211 will advance most. The heaviness of the arrows in FIG. 10 corresponds to the magnitude of the amount of current, in the same way as in FIG. 8, so the heavier an arrow is, the greater the amount of current.

The control unit 280 in this example increases the amount of current flowing through the adjuster 261 connected in parallel to the storage battery module 211 of which the predicted degree of deterioration is the greatest, this current flowing from the negative terminal side toward the positive terminal side of the storage battery module 211. This makes the amount of current flowing from the adjuster 261 to the positive side of the storage battery module 211 to be larger, so the amount of current discharged from the storage battery module 211 is smaller.

The control unit 280 reduces the amount of current flowing at the adjuster 262 from the negative terminal side toward the positive terminal side of the storage battery module 212. This makes the amount of current flowing from the adjuster 262 to the positive side of the storage battery module 212 to be smaller, so the amount of current discharged from the storage battery module 212 is larger.

The control unit 280 reduces the amount of current flowing at the adjuster 263 from the negative terminal side toward the positive terminal side of the storage battery module 213. This makes the amount of current flowing from the adjuster 263 to the positive side of the storage battery module 213 to be smaller, so the amount of current discharged from the storage battery module 213 is larger.

The control unit 280 may also control the adjusters 261, 262, and 263 so that current flows from the negative terminal side of the storage battery module 211 to the positive terminal side at the adjuster 261 but does not flow at the adjusters 262 and 263.

By performing the above operations, the control unit 280 can increase the amount of current discharged from each of the storage battery modules 212 and 213, and reduce the amount of current discharged from the storage battery module 211. That is to say, when the electricity storage device 200 performs discharging, the amount of usage of the storage battery module 211 that has the greatest predicted degree of deterioration out of the storage battery modules 211, 212, and 213 can be reduced.

Accordingly, the electricity storage device 200 can suppress advance in deterioration of the storage battery module 211 of which the predicted degree of deterioration is the greatest. The electricity storage device 200 thus can suppress advance in local deterioration in the storage battery modules 211, 212, and 213.

In the example in FIG. 10, when the electricity storage device 200 performs discharging, a current bypassing the storage battery module 211 flows through the adjuster 261, a current bypassing the storage battery module 212 flows through the adjuster 262, and a current bypassing the storage battery module 213 flows through the adjuster 263. An arrangement may also be made where the amounts of current flowing through the adjusters 261, 262, and 263 are adjusted in accordance with the predicted degree of deterioration of the storage battery modules 211, 212, and 213. For example, an arrangement may be made where the amount of current flowing through the adjuster 261 corresponding to the storage battery module 211, of which the predicted degree of deterioration is the greatest, is the largest, the amount of current flowing through the adjuster 263 corresponding to the storage battery module 213, of which the predicted degree of deterioration is next greatest, is next largest, and the amount of current flowing through the adjuster 262 corresponding to the storage battery module 212, of which the predicted degree of deterioration is smallest out of the storage battery modules 211, 212, and 213, is the smallest.

Figure 11:
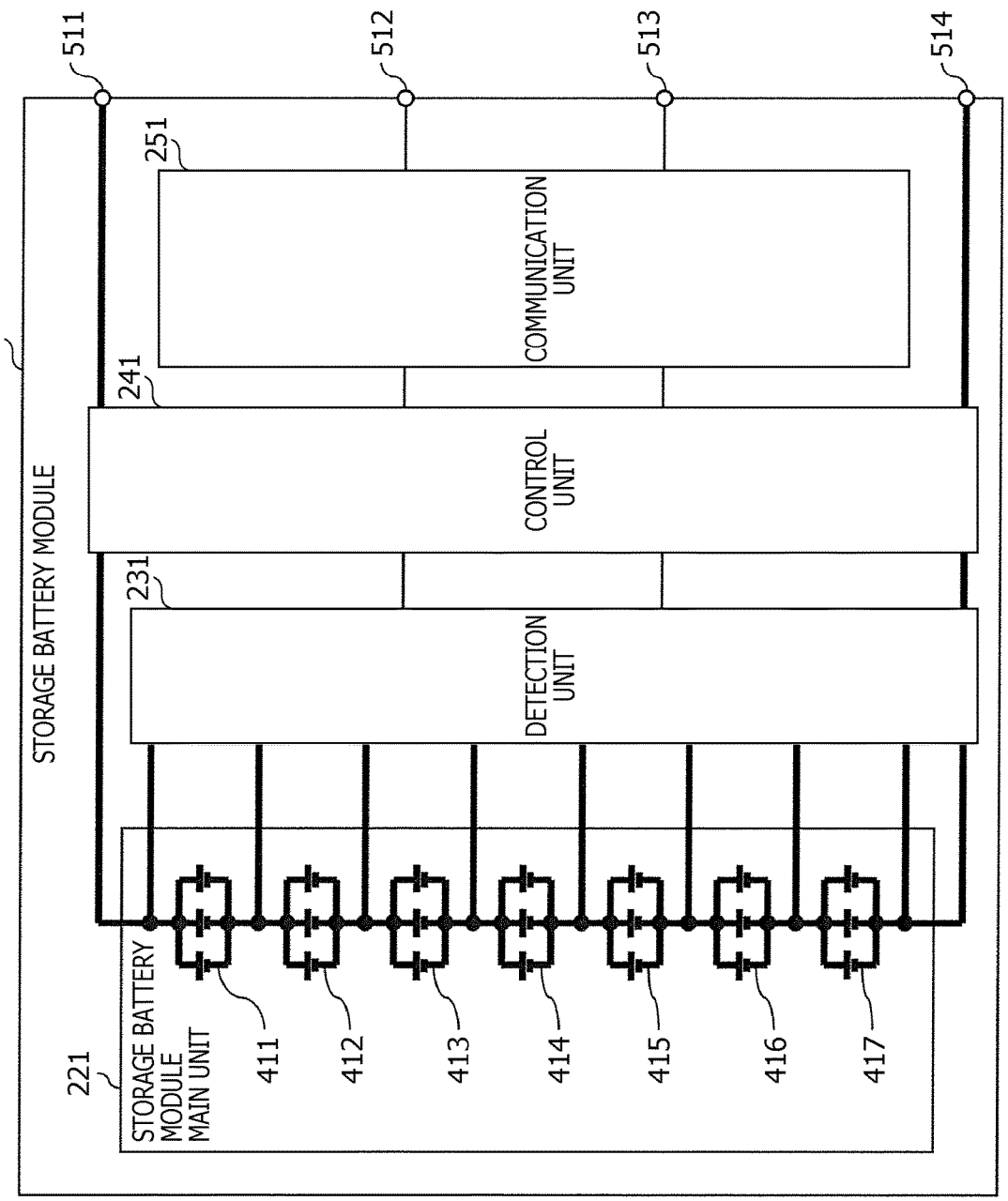
FIG. 11 is a block diagram illustrating the configuration of a storage battery module according to the second embodiment.

FIG. 11 is a block diagram illustrating the configuration of the storage battery module 211 illustrated in FIG. 4. FIG. 11 illustrates a more specific example of the storage battery module 211 illustrated in FIG. 4. The storage battery module 211 illustrated in FIG. 11 has the storage battery module main unit 221, detection unit 231, control unit 241, and communication unit 251, which are also illustrated in FIG. 4. FIG. 11 further illustrates terminals 511 through 514. The storage battery module main unit 221 in the example in FIG. 11 further includes storage battery blocks 411 through 417.

The terminal 511 is a positive terminal of the storage battery module 211, for electric power. The terminal 512 is a communication terminal for the storage battery module 211, and for example is an input terminal to input information to the storage battery module 211. The terminal 513 is a communication terminal for the storage battery module 211, and for example is an output terminal to output information from the storage battery module 211. The terminal 514 is a negative terminal of the storage battery module 211, for electric power. The terminals 511 through 514 are connected to the electricity storage device 200.

Each of the storage battery blocks 411 through 417 are also called "battery blocks", and basically have multiple storage batteries. A storage battery is also referred to as a "single cell" or a "cell". In this example, each of the storage battery blocks 411 through 417 have multiple storage batteries connected in parallel to each other. Note that each of the storage battery blocks 411 through 417 may be a single storage battery.

The detection unit 231 and control unit 241 output the predicted degree of deterioration of the storage battery block of which the deterioration is predicted to be the greatest out of the storage battery blocks 411 through 417, via the communication unit 251 as the predicted degree of deterioration of the storage battery module 211. For example, in a case where prediction is made that the storage battery block 414 will exhibit the greatest deterioration out of the storage battery blocks 411 through 417, the detection unit 231 and control unit 241 output the predicted degree of deterioration of the storage battery block 414 via the communication unit 251 as the predicted degree of deterioration of the storage battery module 211.

The detection unit 231 and control unit 241 may output information indicating state functions for predicting the future degree of deterioration of the storage battery blocks 411 through 417 and the storage battery module 211 via the communication unit 251. The control unit 280 of the electricity storage device 200 may acquire the state functions for predicting the future degree of deterioration of the storage battery blocks 411 through 417 and the storage battery module 211 via the communication unit 270, and predict the future degree of deterioration.

The degree of deterioration of each of the storage battery blocks 411 through 417 is primarily determined based on change in internal resistance, change in charging voltage, change in discharging voltage, and so forth. For example, the degree of deterioration may correspond to change in internal resistance, i.e., the difference or ratio between the initial-state internal resistance and current internal resistance. As deterioration of the storage battery blocks 411 through 417 advances, the internal resistance is presumed to increase. Accordingly, the greater the current internal resistance is in comparison with the initial-state internal resistance, the greater a degree of deterioration may be stipulated. The term "initial state" as used here means a state where deterioration has not advanced, and corresponds to a state of using for the first time or a state before using for the first time.

Alternatively, the degree of deterioration may correspond to change in charging voltage, i.e., the difference or ratio between the initial-state charging voltage and current charging voltage. As deterioration advances, the internal resistance increases, and the charging voltage is presumed to increase. Specifically, the greater the degree of deterioration is, the higher the charging voltage is presumed to be for the same charging current. Accordingly, the greater the current charging voltage is in comparison with the initial-state charging voltage, the greater a degree of deterioration may be stipulated.

Alternatively, the degree of deterioration may correspond to change in discharging voltage, i.e., the difference or ratio between the initial-state discharging voltage and current discharging voltage. As deterioration advances, the internal resistance increases, and the discharging voltage is presumed to decrease. Specifically, the greater the degree of deterioration is, the lower the discharging voltage is presumed to be for the same discharging current. Accordingly, the lower the current discharging voltage is in comparison with the initial-state discharging voltage, the greater a degree of deterioration may be stipulated.

Alternatively, the degree of deterioration may be determined according to a combination of change in internal resistance, change of charging voltage, and change of discharging voltage. The degree of deterioration may also be determined based on internal resistance when charging or discharging, and the degree of fluctuation in each of the charging voltage and discharging voltage. Specifically, the greater the degree of deterioration is, the greater the internal resistance and the degree of fluctuation in each of the charging voltage and discharging voltage is presumed to be for the same charging current or discharging current. Accordingly, the greater a degree of such fluctuation, the greater a degree of deterioration may be stipulated.

The detection unit 231 detects the state function for each of the storage battery blocks 411 through 417. For example, in a state where no current is flowing to the adjuster 261, the detection unit 231 detects the charging voltage or discharging voltage of each of the storage battery blocks 411 through 417, and the current flowing through the storage battery blocks 411 through 417. This eliminates the effects of adjustment current. The detection unit 231 may also detect the internal resistance based on the detected voltage and the detected current.

The control unit 241 predicts the future degree of deterioration for each of the storage battery blocks 411 through 417, based on the state functions detected by the detection unit 231. For example, the control unit 241 may acquire the internal resistance based on the detected voltage and the detected current, and predict the future degree of deterioration based on the acquired internal resistance.

The control unit 241 then acquires, of the multiple predicted degrees of deterioration corresponding to each of the multiple storage battery blocks 411 through 417, the largest predicted degree of deterioration as the predicted degree of deterioration of the storage battery module 211, and transmits the predicted degree of deterioration of the storage battery module 211 via the communication unit 251. The control unit 280 of the electricity storage device 200 receives the predicted degree of deterioration of the storage battery module 211 via the communication unit 270 of the electricity storage device 200, and controls the adjuster 261 based on the predicted degree of deterioration of the storage battery module 211.

The storage battery modules 212 and 213 may have configurations equivalent to the storage battery module 211 illustrated in FIG. 11. Accordingly, the adjusters 261, 262, and 263 are controlled in each of the storage battery modules 211, 212, and 213, based on the predicted degree of deterioration of the storage battery block regarding which prediction has been made that deterioration will advance the most. Thus, local advance in deterioration can be suppressed, and the longevity of the storage battery modules 211, 212, and 213 can be extended as a whole.

Note that the degree of deterioration may be estimated based on the temperature of the storage battery modules 211, 212, and 213 or the storage battery blocks 411 through 417. The degree of deterioration may also be estimated based on the number of times of charging/discharging. Alternatively, the degree of deterioration may corresponding to State of Health (SOH) that indicates the current full-charge capacity as to the initial full-charge capacity. For example, the smaller the SOH is, the greater the degree of deterioration is. The future degree of deterioration may also be predicted based on the temperature of the storage battery modules 211, 212, and 213 or the storage battery blocks 411 through 417.

Particularly, the control unit 280 of the electricity storage device 200 adjusts the amount of current of the adjusters 261, 262, and 263 if prediction is made that difference will occur in the degree of deterioration of the storage battery modules 211, 212, and 213 in the future, even if there currently is no difference in the degree of deterioration among the storage battery modules 211, 212, and 213.

For example, in a case where a state in which voltage of a particular storage battery block out of the storage battery blocks 411 through 417 is continuously or frequently high when the storage battery module 211 is fully charged, it can be predicted that deterioration of this particular storage battery block will advance more than the other storage battery blocks. In the electricity storage device 200 that has multiple storage battery modules, it is predicted that deterioration of a storage battery module, including a storage battery block regarding which voltage is continuously or frequently the highest out of all of the storage battery blocks included in the storage battery modules when the electricity storage device 200 is in a fully charged state, will advance more than other storage battery modules. This deterioration is also referred to as "State of Charge (SOC) deterioration".

A specific example of prediction of deterioration of storage battery modules that takes this deterioration into consideration will be described. First, assumption will be made that each of the three storage battery modules 211, 212, and 213 of the electricity storage device 200 have seven storage battery blocks. Each time the electricity storage device 200 reaches full charge, the control unit 280 measures the voltage at each storage battery block when fully charged, via the detection units 231, 232, and 233. The control unit 280 then orders the storage battery blocks in order of high voltage, from first through twenty-first.

Next, the control unit 280 give points to the storage battery blocks in accordance with the order that has been give according to the voltage when fully charged. For example, the control unit 280 gives 10 points to the storage battery block that is first, 8 points to the storage battery blocks that are second and third, 6 points to the storage battery blocks that are fourth through sixth, 4 points to the storage battery blocks that are seventh through tenth, 2 points to the storage battery blocks that are eleventh through fifteenth, and 0 points to the storage battery blocks that are sixteenth through twenty-first. These points are stored with each full charge and accumulated.

The control unit 280 predicts that of the storage battery modules 211, 212, and 213, a storage battery module including a storage battery block of which the accumulated points have reached a predetermined value will deteriorate more than the other storage battery modules. The control unit 280 then lowers the charging current of the storage battery module including the storage battery block of which the accumulated points have reached a predetermined value, by a predetermined amount using one of the adjusters 261, 262, and 263. For example, the control unit 280 may lower the charging current of a storage battery module including the storage battery block of which the accumulated points have reached 50 points by 2%, or may lower the charging current thereof by 80 mA.

In a case where the charging current has been lowered, or alternatively, in a case where full charge has been repeated for a predetermined number of times such as seven times, for example, without any of the storage battery blocks reaching the predetermined score, the control unit 280 resets all points accumulated so far to 0 points.

The control unit 280 then accumulates the points again, with each full charge. The control unit 280 then lowers the charging current of the storage battery module including the storage battery block of which the accumulated points have reached a predetermined value, by a predetermined amount, again. At this time, if the control unit 280 has already lowered the charging current of that storage battery module by a predetermined amount in the past, the control unit 280 further lowers the charging current of the storage battery module by a predetermined amount. For example, the control unit 280 may lower the charging current of that storage battery module by a total of 4%, or may lower the charging current thereof by 160 mA.

Figure 12:
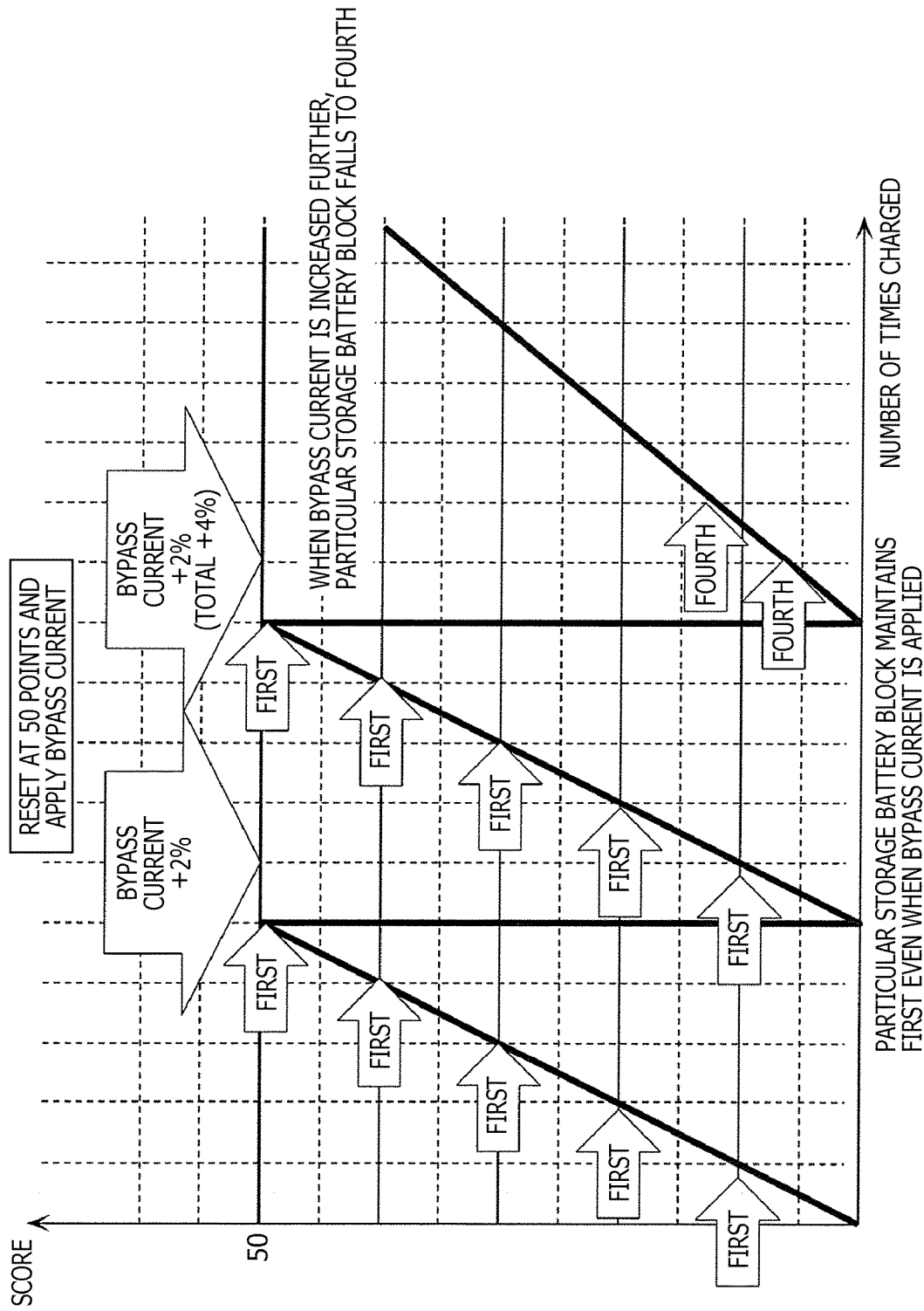
FIG. 12 is a graph illustrating the change of points accumulated regarding a particular storage battery block according to the second embodiment.

By repeating the above-described operations, a situation where a particular storage battery block continuously exhibits high voltage when fully charged can be suppressed. In a case where a state in which the voltage of a particular storage battery block is high is repeated, the amount of reduction in charging current is increased. This lowers the frequency at which the particular storage battery block exhibits high voltage. Consequently, high SOC deterioration is suppressed, and a situation where deterioration of just a particular storage battery block advances can be suppressed. FIG. 12 illustrates an example of transition of points accumulated for a particular storage battery block.

In a case where a state in which voltage of a particular storage battery block out of the storage battery blocks 411 through 417 is continuously or frequently lowest when the storage battery module 211 has completed discharging, it can be predicted that deterioration of this particular storage battery block will advance more than the other storage battery blocks. In the electricity storage device 200 that has multiple storage battery modules, it is predicted that deterioration of a storage battery module, including a storage battery block regarding which voltage is continuously or frequently lowest out of all of the storage battery blocks included in the storage battery modules when discharge of the electricity storage device 200 is completed, will advance more than other storage battery modules. This deterioration is also referred to as "low-voltage deterioration".

In a case where a state in which the temperature of a particular storage battery module out of the storage battery modules 211, 212, and 213 is continuously or frequently higher than the other storage battery modules, it can be predicted that deterioration of this particular storage battery module will advance more than the other storage battery modules. Particularly, in a case where a state in which the temperature of a particular storage battery module is continuously or frequently a predetermined threshold value (e.g., 30° C.) or higher as compared with the other storage battery modules, it is predicted that deterioration of the particular storage battery module will advance more than the other storage battery modules. This deterioration is also referred to as "hot-state deterioration".

In a case where a state in which the temperature of a particular storage battery module out of the storage battery modules 211, 212, and 213 is continuously or frequently lower than the other storage battery modules when charging, it can be predicted that deterioration of this particular storage battery module will advance more than the other storage battery modules. Particularly, in a case where a state in which the temperature of a particular storage battery module is continuously or frequently a predetermined threshold value (e.g., 0° C., 10° C., etc.) or lower, is occurring continuously or frequently in comparison with the other storage battery modules when charging, it is predicted that deterioration of the particular storage battery module will advance more than the other storage battery modules. This deterioration is also referred to as "cold-charging deterioration".

In a case where a state in which the temperature of a particular storage battery module out of the storage battery modules 211, 212, and 213 is continuously or frequently higher than the other storage battery modules when charging, it can be predicted that deterioration of this particular storage battery module will advance more than the other storage battery modules. Particularly, in a case where a state in which the temperature of a particular storage battery module is continuously or frequently a predetermined threshold value (e.g., 30° C.) or higher, is occurring continuously or frequently as compared with the other storage battery modules when charging, it is predicted that deterioration the particular storage battery module will advance more than the other storage battery modules. This deterioration is also referred to as "hot-charging deterioration".

The control unit 280 of the electricity storage device 200 detects that a state where prediction is made that advance of deterioration such as described above is continuously or frequently occurring as compared to other storage battery modules, via the detection units 231, 232, and 233, and predicts advance of deterioration of the storage battery modules 211, 212, and 213. In a case where there currently is no difference in degree of deterioration among the storage battery modules 211, 212, and 213, the control unit 280 of the electricity storage device 200 reduces at least one of charging amount and discharging amount of a storage battery module regarding which prediction is made that deterioration will advance most, so as to be lower than the other storage battery modules. Thus, the control unit 280 of the electricity storage device 200 can suppress difference in the degree of deterioration from occurring among the storage battery modules 211, 212, and 213, or from difference in the degree of deterioration from spreading.

Figure 13:
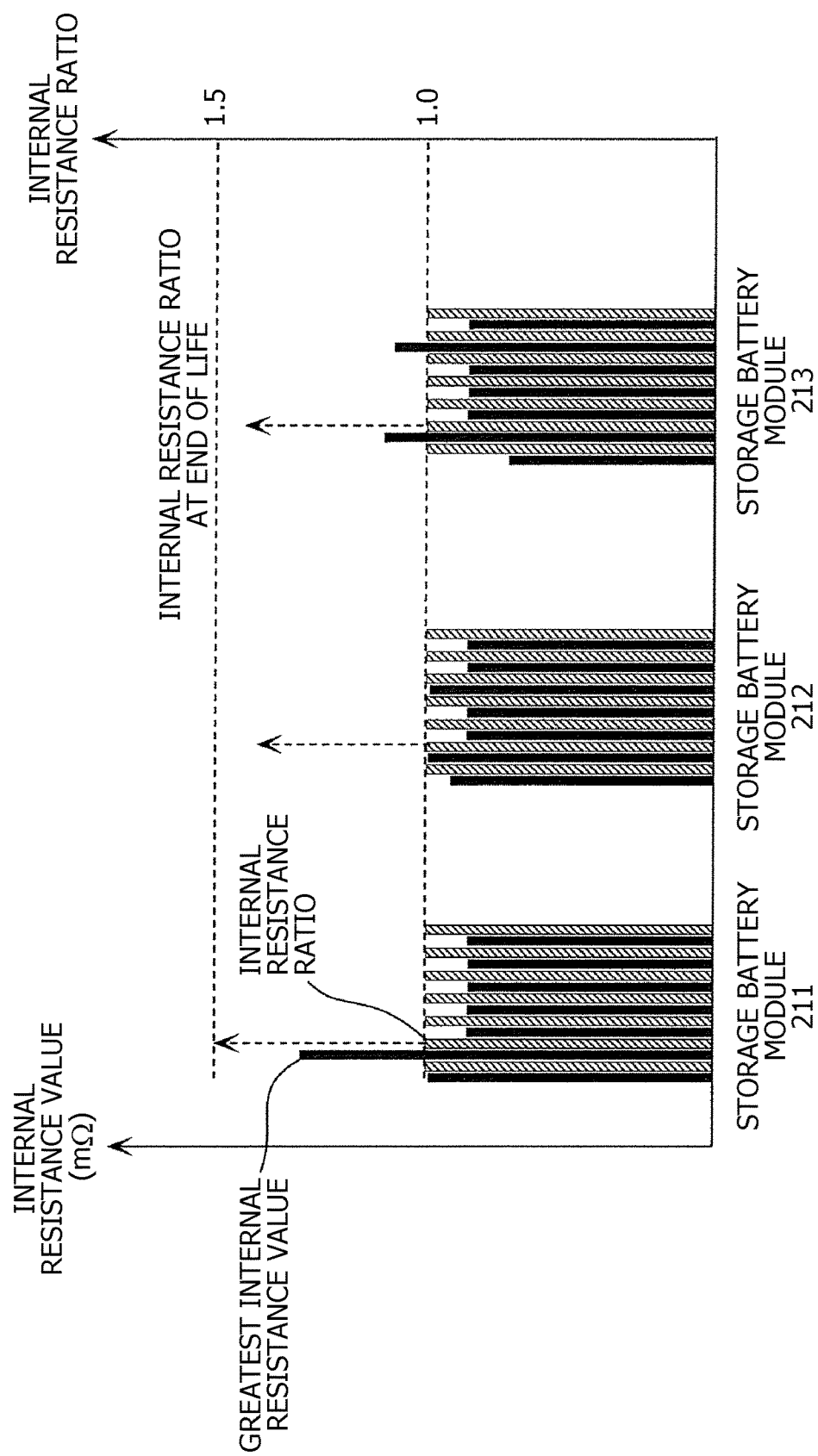
FIG. 13 is a schematic diagram illustrating internal resistance values and resistance values ratios of storage battery modules according to the second embodiment.

FIG. 13 is a schematic diagram illustrating the internal resistance values of the storage battery modules 211, 212, and 213 illustrated in FIG. 4, and the internal resistance ratio which is the ratio of the current internal resistance value as to the internal resistance value of an initial state before use. FIG. 13 shows the internal resistance values of the storage battery blocks of the storage battery modules 211, 212, and 213 in the initial state, before the storage battery modules 211, 212, and 213 were ever used, as solid bars. FIG. 13 also shows the internal resistance ratio of the storage battery blocks of the storage battery modules 211, 212, and 213 in the initial state, before the storage battery modules 211, 212, and 213 were ever used, as hatched bars. The internal resistance ratio indicates the degree of deterioration of each storage battery block, and in the initial state, all storage battery blocks are at 1 . Even in an initial state, before the storage battery modules 211, 212, and 213 were ever used, i.e., in a state where there is no deterioration of the storage battery modules 211, 212, and 213, there is variation in the internal resistance values of the storage battery blocks, due to variation in quality.

As the storage battery modules 211, 212, and 213 are used, the storage battery modules 211, 212, and 213 deteriorate, and the internal resistance values of the storage battery blocks rise. When the internal resistance ratio of a particular storage battery block reaches an end-of-life internal resistance ratio (e.g., 1.5), the life of the multiple storage battery blocks connected serially to the particular storage battery block is judged to have ended. That is to say, when the internal resistance ratio of a particular storage battery block reaches the end-of-life internal resistance ratio, the life of the storage battery module including the particular storage battery block that has reached the end of its life is judged to have ended.

In a case where the internal resistance value of a particular storage battery block in the storage battery modules 211, 212, and 213 normally exhibits the maximum value, there is a possibility that a state where the charging voltage of the particular storage battery block is high is continuing, or a state where the discharging voltage of the particular storage battery block is low is continuing. Accordingly, it is predicted that deterioration of this particular storage battery block will advance more than the other storage battery blocks.

Accordingly, the control unit 280 of the electricity storage device 200 sets at least one of the charging amount and the discharging amount of the storage battery module including this particular storage battery block to be lower than the other storage battery modules. Thus, the control unit 280 of the electricity storage device 200 can suppress advance of deterioration of the particular storage battery block. By suppressing advance of deterioration of the particular storage battery block where prediction is made that deterioration will advance most, the control unit 280 of the electricity storage device 200 can suppress difference from occurring in the degree of deterioration among the storage battery modules 211, 212, and 213.

According to this example, the internal resistance of a particular storage battery block within the storage battery module 211 is highest, but the internal resistance ratio is 1, which is the same as the other storage battery blocks, so there is no difference in the degree of deterioration. However, the storage battery block that exhibits the highest internal resistance from the initial state has a high possibility of exhibiting highest voltage when charging is completed and lowest voltage when discharging is completed. Accordingly, at least one of the charging amount when charging and the discharging amount when discharging is made to be smaller for the storage battery module 211 including the storage battery block that has high internal resistance from the initial state, as compared to the other storage battery modules. Accordingly, the control unit 280 of the electricity storage device 200 can suppress advance in deterioration of the particular storage battery block that has high internal resistance from the initial state. By suppressing advance in deterioration of the particular storage battery block where deterioration is predicted to advance most, the control unit 280 of the electricity storage device 200 can suppress difference in the degree of deterioration from occurring among the storage battery modules 211, 212, and 213.

Figure 14:
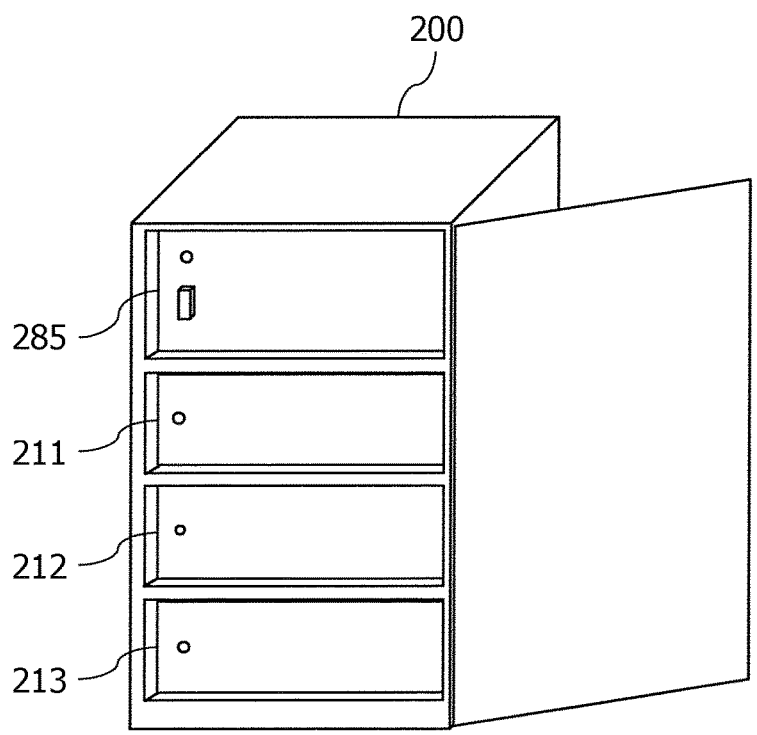
FIG. 14 is an external view illustrating the electricity storage device according to the second embodiment.

FIG. 14 is an external view of the electricity storage device 200 illustrated in FIG. 4. The electricity storage device 200 illustrated in FIG. 14 has a control device 285 and the storage battery modules 211, 212, and 213. The control device 285 corresponds to the communication unit 270, control unit 280, and power source 290 illustrated in FIG. 4. Specifically, the control device 285 is a device having the communication unit 270, control unit 280, and power source 290 illustrated in FIG. 4.

In this example, the temperature of the storage battery module 211 is higher than the temperature of the storage battery modules 212 and 213 due to the effects of heat from the power source 290. Accordingly, it is predicted that the degree of deterioration of the storage battery module 211 will be greater than the degree of deterioration of the storage battery modules 212 and 213 due to hot-state deterioration or hot-charging deterioration. Accordingly, the control unit 280 of the electricity storage device 200 sets at least one of the charging amount and discharging amount of the storage battery module 211 to be lower than the other storage battery modules 212 and 213, for example, when there is no difference in the degree of deterioration among the storage battery modules 211, 212, and 213.

Accordingly, the control unit 280 of the electricity storage device 200 can suppress advance in deterioration of the storage battery module 211, and suppress difference in the degree of deterioration from occurring among the storage battery modules 211, 212, and 213. Particularly, the control unit 280 of the electricity storage device 200 may set the charging amount of the storage battery module 211 to be smaller than the other storage battery modules 212 and 213 in charging at a predetermined threshold value that is higher than a standard environment temperature (e.g., 30° C.) or higher.

Also, the temperature of the storage battery module 213 is relatively low as compared to the storage battery modules 211 and 212 since there is little effect of heat of the power source 290. Accordingly, it is predicted that the degree of deterioration of the storage battery module 213 will be greater than the degree of deterioration of the storage battery modules 211 and 212 due to cold-charging deterioration. The control unit 280 of the electricity storage device 200 thus sets at least one of the charging amount and discharging amount of the storage battery module 213 to be smaller than the other storage battery modules 211 and 212, for example, in a state where there is no difference in the degree of deterioration among the storage battery modules 211, 212, and 213.

Accordingly, the control unit 280 of the electricity storage device 200 can suppress advance in deterioration of the storage battery module 213, and suppress difference in the degree of deterioration from occurring among the storage battery modules 211, 212, and 213. Particularly, the control unit 280 of the electricity storage device 200 may set the charging amount of the storage battery module 213 to be smaller than the other storage battery modules 211 and 212 in charging at a predetermined threshold value that is lower than a standard environment temperature (e.g., 0° C.) or lower.

Figure 15:
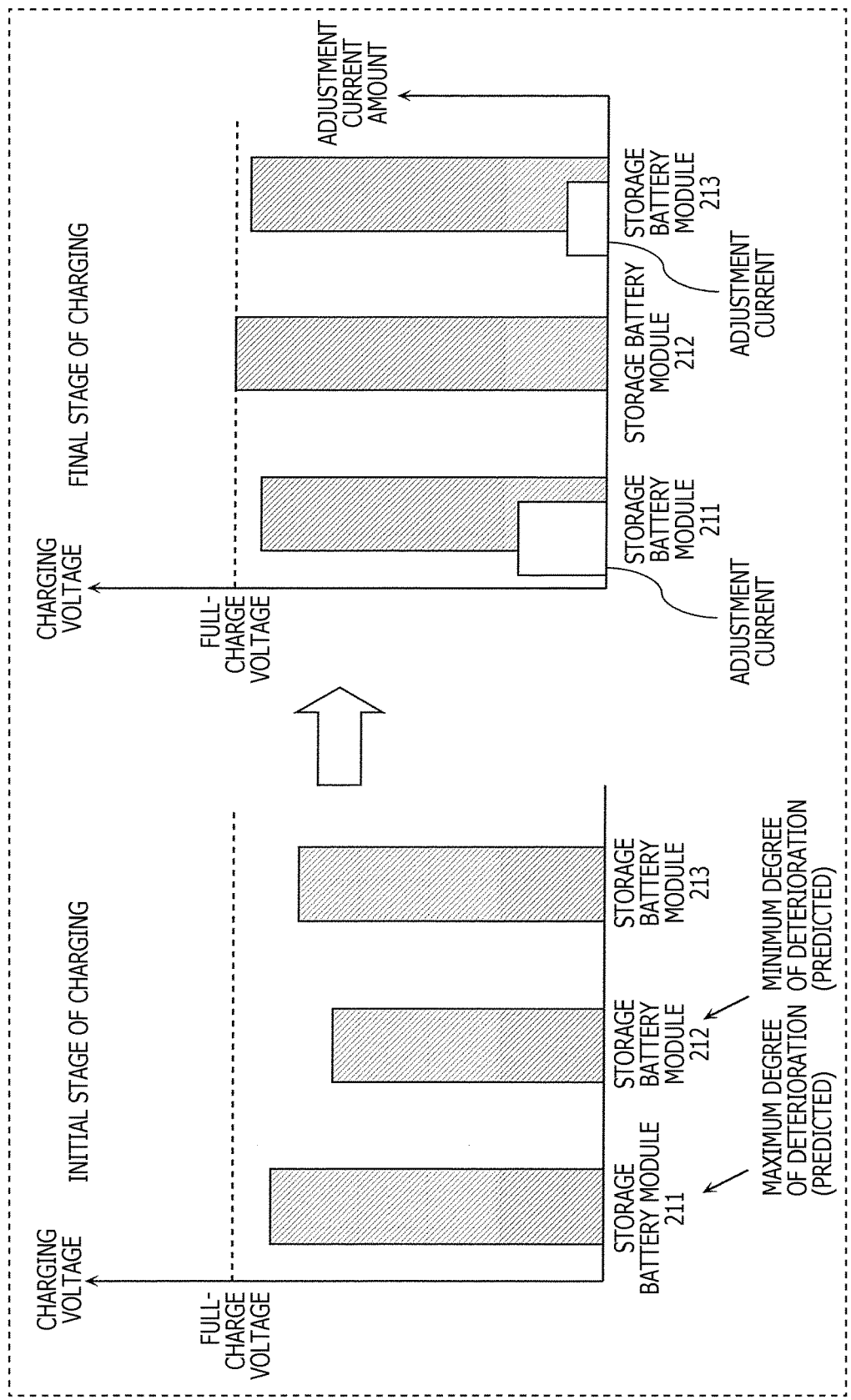
FIG. 15 is a schematic diagram illustrating a voltage state according to the second embodiment when charging.

FIG. 15 is a schematic diagram illustrating the voltage state when charging in the electricity storage device 200 illustrated in FIG. 4. In this example, assuming that there is no difference in the degree of deterioration among the storage battery modules 211, 212, and 213, the predicted degree of deterioration of the storage battery module 211 is the greatest, and the predicted degree of deterioration of the storage battery module 212 is the smallest. The charging voltage in FIG. 15 may be the charging voltage of the storage battery block regarding which prediction has been made that deterioration will advance the most, in each of the storage battery modules 211, 212, and 213.

The control unit 280 does not apply current to the adjusters 261, 262, and 263 in the initial stage of charging. In this example, in the initial stage of charging, the charging voltage of the storage battery module 211 is the highest, the charging voltage of the storage battery module 213 is the next highest, and the charging voltage of the storage battery module 212 is the lowest. The control unit 280 then decides an adjustment current amount that is a current amount to flow at the adjusters 261, 262, and 263, based on the predicted degree of deterioration.

For example, the control illustrated in FIG. 6 is performed when charging. The control unit 280 decides the adjustment current amount flowing to the adjuster 261 corresponding to the storage battery module 211 to be the greatest adjustment current amount in accordance with the predicted degree of deterioration, and decides the adjustment current amount flowing to the adjuster 262 corresponding to the storage battery module 212 to be 0. The control unit 280 may set the adjustment current amount flowing to the adjuster 263 corresponding to the storage battery module 213 to a value smaller than the largest adjustment current amount but larger than 0.

At the final stage of charging, the control unit 280 controls the adjustment current amount flowing through the adjusters 261, 262, and 263 so that the storage battery module 212 of which the predicted degree of deterioration is smallest is fully charged, and the storage battery module 211 of which the predicted degree of deterioration is the greatest is not fully charged. That is to say, the control unit 280 sets the voltage of the storage battery module 212 to a charging-termination voltage, sets the voltage of the storage battery module 211 to a voltage lower than the charging-termination voltage, and stops charging. In other words, the control unit 280 sets the voltage of the storage battery module 212 to charging-termination voltage, sets the voltage of the storage battery module 211 to a voltage lower than charging-termination voltage, and stops the charging. Note that the charging-termination voltage is a predetermined voltage at which charging is stopped.

Figure 16:
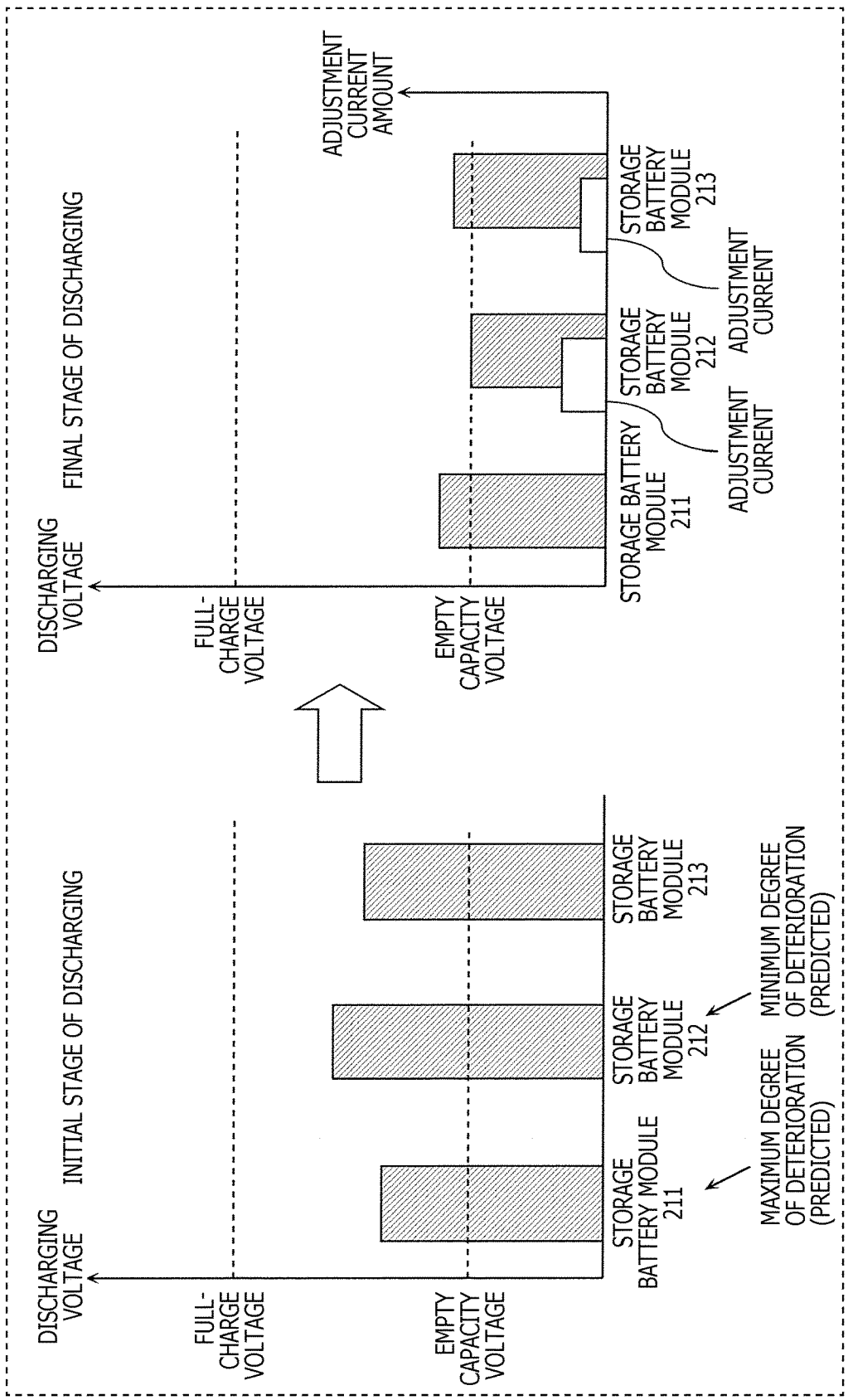
FIG. 16 is a schematic diagram illustrating a voltage state according to the second embodiment when charging.

FIG. 16 is a schematic diagram illustrating the voltage state when discharging in the electricity storage device 200 illustrated in FIG. 4. In this example, assuming that there is no difference in the degree of deterioration among the storage battery modules 211, 212, and 213, the predicted degree of deterioration of the storage battery module 211 is the greatest, and the predicted degree of deterioration of the storage battery module 212 is the smallest, in the same way as in FIG. 15. The discharging voltage in FIG. 16 may be the discharging voltage of the storage battery block regarding which prediction has been made that deterioration will advance the most, in each of the storage battery modules 211, 212, and 213.

The control unit 280 does not apply current to the adjusters 261, 262, and 263 in the initial stage of discharging. In this example, in the initial stage of discharging, the discharging voltage of the storage battery module 211 is the lowest, the discharging voltage of the storage battery module 213 is the next lowest, and the discharging voltage of the storage battery module 212 is the highest. The control unit 280 then decides an adjustment current amount that is a current amount to flow at the adjusters 261, 262, and 263, based on the predicted degree of deterioration.

For example, the control illustrated in FIG. 8 is performed when discharging. The control unit 280 decides the adjustment current amount flowing to the adjuster 261 corresponding to the storage battery module 211 to be 0 in accordance with the predicted degree of deterioration, and decides the adjustment current amount flowing to the adjuster 262 corresponding to the storage battery module 212 to be the greatest adjustment current amount. The control unit 280 may set the adjustment current amount flowing to the adjuster 263 corresponding to the storage battery module 213 to a value smaller than the largest adjustment current amount but larger than 0.

At the final stage of discharging, the control unit 280 controls the adjustment current amount flowing through the adjusters 261, 262, and 263 so that the storage battery module 212 of which the predicted degree of deterioration is smallest is empty, and the storage battery module 211 of which the predicted degree of deterioration is the greatest is not empty. That is to say, the control unit 280 sets the discharging voltage of the storage battery module 212 to empty capacity voltage, sets the discharging voltage of the storage battery module 211 to a voltage higher than the empty capacity voltage, and stops discharging. In other words, the control unit 280 sets the voltage of the storage battery module 212 to a discharging-termination voltage, sets the voltage of the storage battery module 211 to a voltage higher than the discharging-termination voltage, and stops discharging. Note that the discharging-termination voltage is a predetermined voltage at which discharging is stopped. When the discharging voltage reaches the discharging-termination voltage, discharging is stopped.

Figure 17:
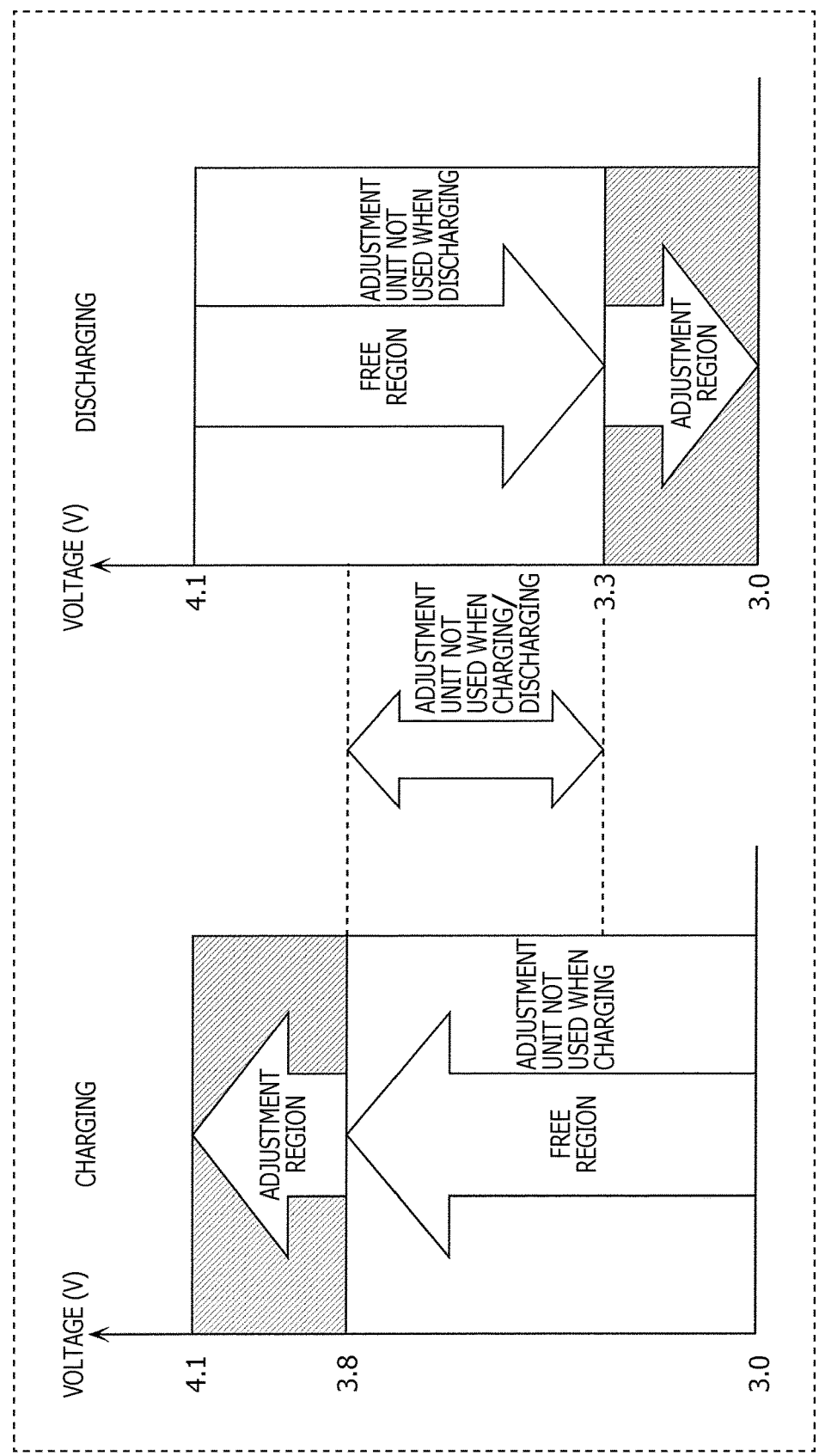
FIG. 17 is a conceptual view illustrating an adjustment region according to the second embodiment.

FIG. 17 is a conceptual diagram illustrating an adjustment region of the electricity storage device 200 illustrated in FIG. 4. Applying current to the adjusters 261, 262, and 263, for example, creates loss of energy. Accordingly, no current needs to be applied by the control unit 280 to the adjusters 261, 262, and 263 in a range where the effects on the storage battery modules of deterioration of the voltage of the storage battery modules is small.

Accordingly, the control unit 280 adjusts the current amount flowing to the adjusters 261, 262, and 263 in a region where the voltage of the storage battery modules 211, 212, and 213 exacerbates advance in deterioration of the storage battery modules 211, 212, and 213, or in a region immediately before that region, and does not adjust the current amount in other regions. For example, a region of voltage from 3.0 V, which corresponds to empty capacity voltage, to 4.1 V, which corresponds to full-charge voltage, is divided into a free region and an adjustment region. Charging and discharging is freely performed in the free region without the amount of current being adjusted, while the current amount is adjusted in the adjustment region when charging and discharging.

Specifically, in a case where the highest voltage of multiple storage battery blocks is in the free region from 3.0 V to 3.8 V when charging, the control unit 280 does not adjust the amount of current flowing to the adjusters 261, 262, and 263. Charging is freely performed at this time. On the other hand, when the voltage of the storage battery block exhibiting the highest voltage is in the adjustment region from 3.8 V to 4.1 V, the control unit 280 adjusts the current amount flowing to the adjusters 261, 262, and 263. Thus, the charging of the storage battery modules 211, 212, and 213 is adjusted.

That is to say, charging is freely performed until the highest voltage of the multiple storage battery blocks reaches 3.8 V. After the highest voltage of the multiple storage battery blocks reaches 3.8 V, charging is adjusted by the adjusters 261, 262, and 263.

Also, in a case where the lowest voltage of multiple storage battery blocks is in the free region from 4.1 V to 3.3 V when discharging, the control unit 280 does not adjust the amount of current flowing to the adjusters 261, 262, and 263. Discharging is freely performed at this time. On the other hand, when the voltage of the storage battery block exhibiting the lowest voltage is in the adjustment region from 3.3 V to 3.0 V, the control unit 280 adjusts the current amount flowing to the adjusters 261, 262, and 263. Thus, the discharging of the storage battery modules 211, 212, and 213 is adjusted.

That is to say, discharging is freely performed until the lowest voltage of the multiple storage battery blocks reaches 3.3 V. After the lowest voltage of the multiple storage battery blocks reaches 3.3 V, discharging is adjusted by the adjusters 261, 262, and 263.

Note that in a case where the highest voltage of the multiple storage battery blocks is between 3.0 V to 3.8 V and the lowest voltage is between 4.1 V to 3.3 V, both charging and discharging are freely performed.

Alternatively, the control unit 280 may perform determination of whether in the free region or adjustment region regarding all of the storage battery modules 211, 212, and 213, based on the highest voltage or lowest voltage of all storage battery blocks included in the storage battery modules 211, 212, and 213. Alternatively, the control unit 280 may perform determination of whether in the free region or adjustment region individually for each of the storage battery modules 211, 212, and 213.

For example, the control unit 280 may perform determination of whether in the free region or adjustment region for the storage battery module 211, based on the highest voltage or lowest voltage of the storage battery blocks 411 through 417 of the storage battery module 211. In a case where the highest voltage or the lowest voltage of the storage battery blocks 411 through 417 of the storage battery module 211 is within the adjustment range, the control unit 280 may adjust the current amount flowing to the adjuster 261.

Specifically, the control unit 280 may decide whether or not to adjust the current amount of the adjuster 262, based on the highest voltage or the lowest voltage of the storage battery blocks of the storage battery module 212. Also, the control unit 280 may decide whether or not to adjust the current amount of the adjuster 263, based on the highest voltage or the lowest voltage of the storage battery blocks of the storage battery module 213.

Figure 18:
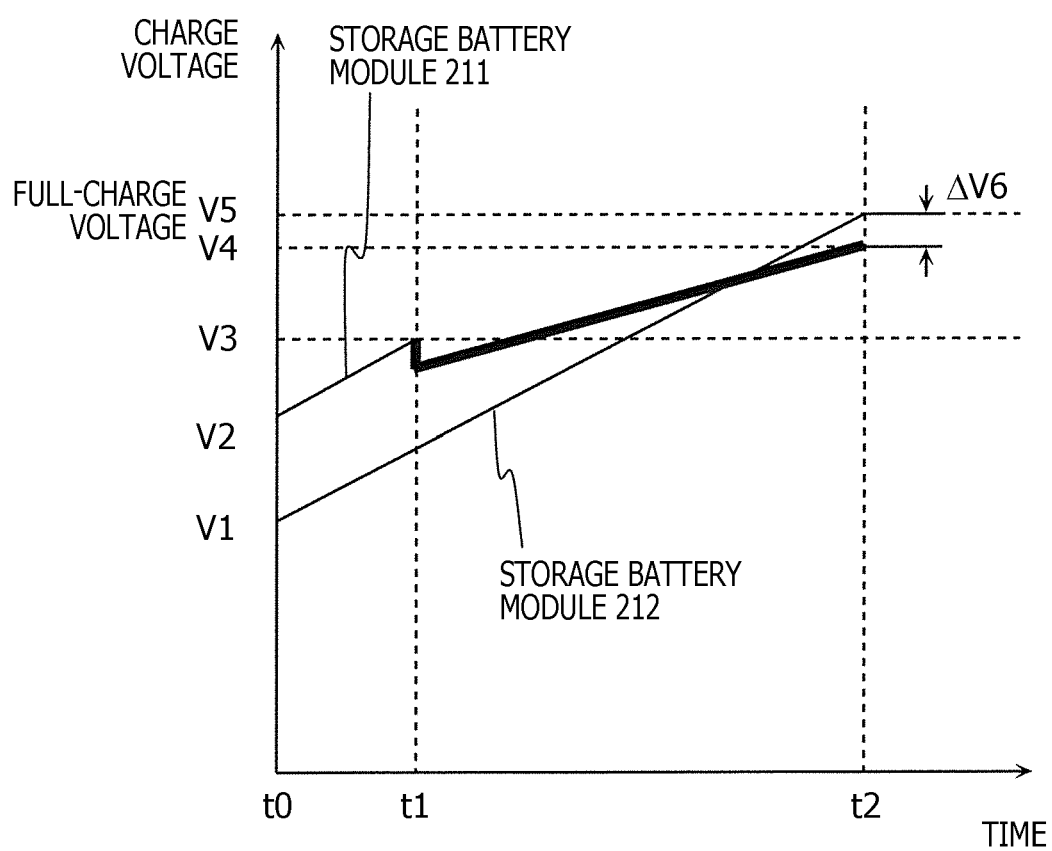
FIG. 18 is a transition diagram illustrating change in voltage according to the second embodiment when charging.

FIG. 18 is a transition diagram illustrating the change of voltage at the electricity storage device 200 illustrated in FIG. 4 when charging. In this example, when there is no difference occurring in the degree of deterioration among the storage battery modules 211, 212, and 213, the predicted degree of deterioration of the storage battery module 211 is great, and the predicted degree of deterioration of the storage battery module 212 is small. The heavy line in FIG. 18 represents the change of voltage of the storage battery module 212 when adjustment is being performed.

The charging voltage of the storage battery module 211 may be the charging voltage of the storage battery block in the storage battery module 211 regarding which prediction has been made that deterioration will advance most. In the same way, the charging voltage of the storage battery module 212 may be the charging voltage of the storage battery block in the storage battery module 212 regarding which prediction has been made that deterioration will advance most.

In this example, charging starts from time t0. When starting charging, the charging voltage of the storage battery module 212 is V1, and the charging voltage of the storage battery module 211 is V2. As the remaining capacity of the storage battery modules 211 and 212 increases, the charging voltage rises. At time t1, the charging voltage of the storage battery module 211 reaches V3 that corresponds to the threshold value of the adjustment region. After time t1, the control unit 280 applies the current bypassing the storage battery module 211 to the adjuster 261.

Specifically, in this case, the control illustrated in FIG. 6 is performed. At time t1, when the control unit 280 starts current to flow that bypasses the storage battery module 211, the charging voltage of the storage battery module 211 decreases in accordance with the decrease in the current charged to the storage battery module 211. After time t1, the rate of increase of the remaining capacity of the storage battery module 211 decreases, and the rate of increase in charging voltage decreases.

On the other hand, normal charging is continued at the storage battery module 212. Accordingly, the storage battery module 212 reaches V5, which is the full-charge voltage, at time t2 before the storage battery module 211. Thus, charging stops.

When charging stops, the charging voltage of the storage battery module 212 is V5, and the charging voltage of the storage battery module 211 is V4 that is lower than V5. That is to say, the control unit 280 sets the storage battery module 212 to a higher voltage than the storage battery module 211, and stops charging with a difference of V5−V4=Δ6.

Figure 19:
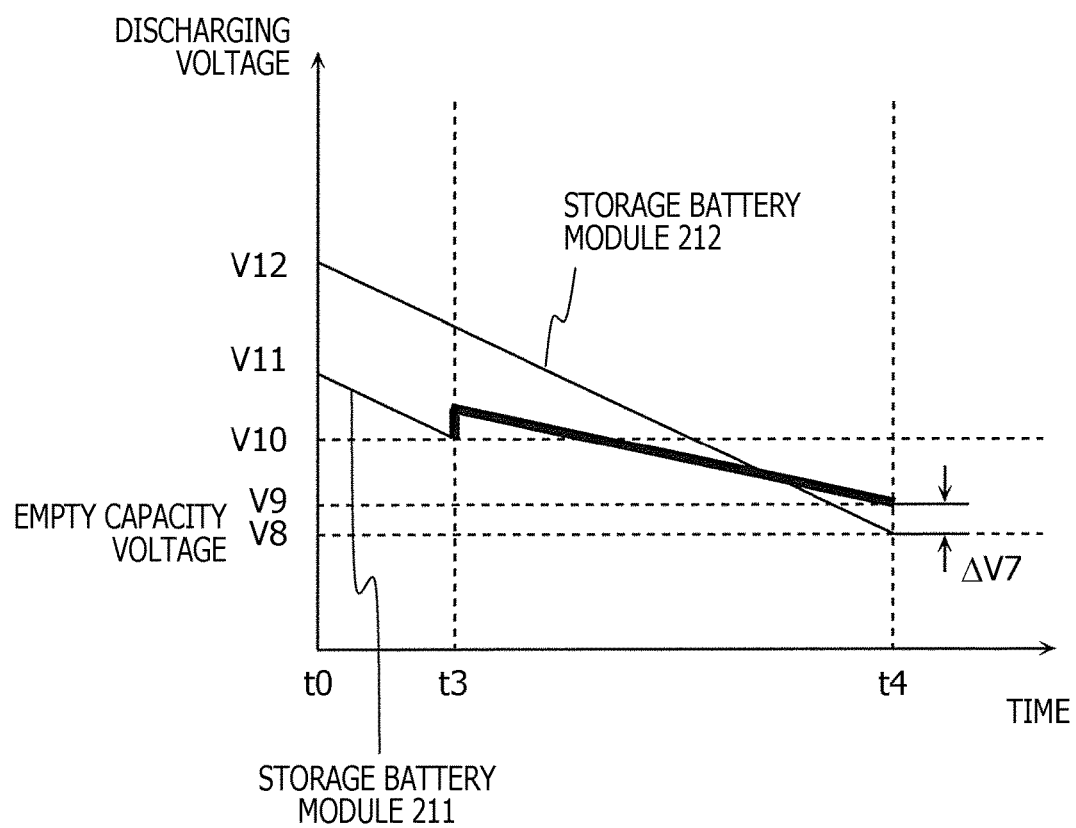
FIG. 19 is a transition diagram illustrating change in voltage according to the second embodiment when discharging.

FIG. 19 is a transition diagram illustrating the change of voltage at the electricity storage device 200 illustrated in FIG. 4 when discharging. In this example, when there is no difference occurring in the degree of deterioration among the storage battery modules 211, 212, and 213, the predicted degree of deterioration of the storage battery module 211 is great, and the predicted degree of deterioration of the storage battery module 212 is small, in the same way as in the example in FIG. 18. The heavy line in FIG. 19 represents the change of voltage of the storage battery module 212 when adjustment is being performed.

The discharging voltage of the storage battery module 211 may be the discharging voltage of the storage battery block in the storage battery module 211 regarding which prediction has been made that deterioration will advance most. In the same way, the discharging voltage of the storage battery module 212 may be the discharging voltage of the storage battery block in the storage battery module 212 regarding which prediction has been made that deterioration will advance most.

In this example, discharging starts from time t0. When starting discharging, the discharging voltage of the storage battery module 212 is V12, and the discharging voltage of the storage battery module 211 is V11. As the remaining capacity of the storage battery modules 211 and 212 decreases, the discharging voltage drops. At time t3, the discharging voltage of the storage battery module 211 reaches V10 that corresponds to the threshold value of the adjustment region. After time t3, the control unit 280 applies the current bypassing the storage battery module 211 to the adjuster 261.

Specifically, in this case, the control illustrated in FIG. 10 is performed. At time t3, when the control unit 280 starts current to flow that bypasses the storage battery module 211, the discharging voltage of the storage battery module 211 increases in accordance with the decrease in the current discharged from the storage battery module 211. After time t3, the rate of decrease of the remaining capacity of the storage battery module 211 decreases, and the rate of decrease in charging voltage decreases.

On the other hand, normal discharging is continued at the storage battery module 212. Accordingly, the storage battery module 212 reaches V8, which is the empty capacity voltage, at time t4 before the storage battery module 211. Thus, discharging stops.

When discharging stops, the discharging voltage of the storage battery module 212 is V8, and the discharging voltage of the storage battery module 211 is V9 that is higher than V8. That is to say, the control unit 280 sets the storage battery module 212 to a lower voltage than the storage battery module 211, and stops discharging with a difference of V9−V8=Δ7.

Figure 20:
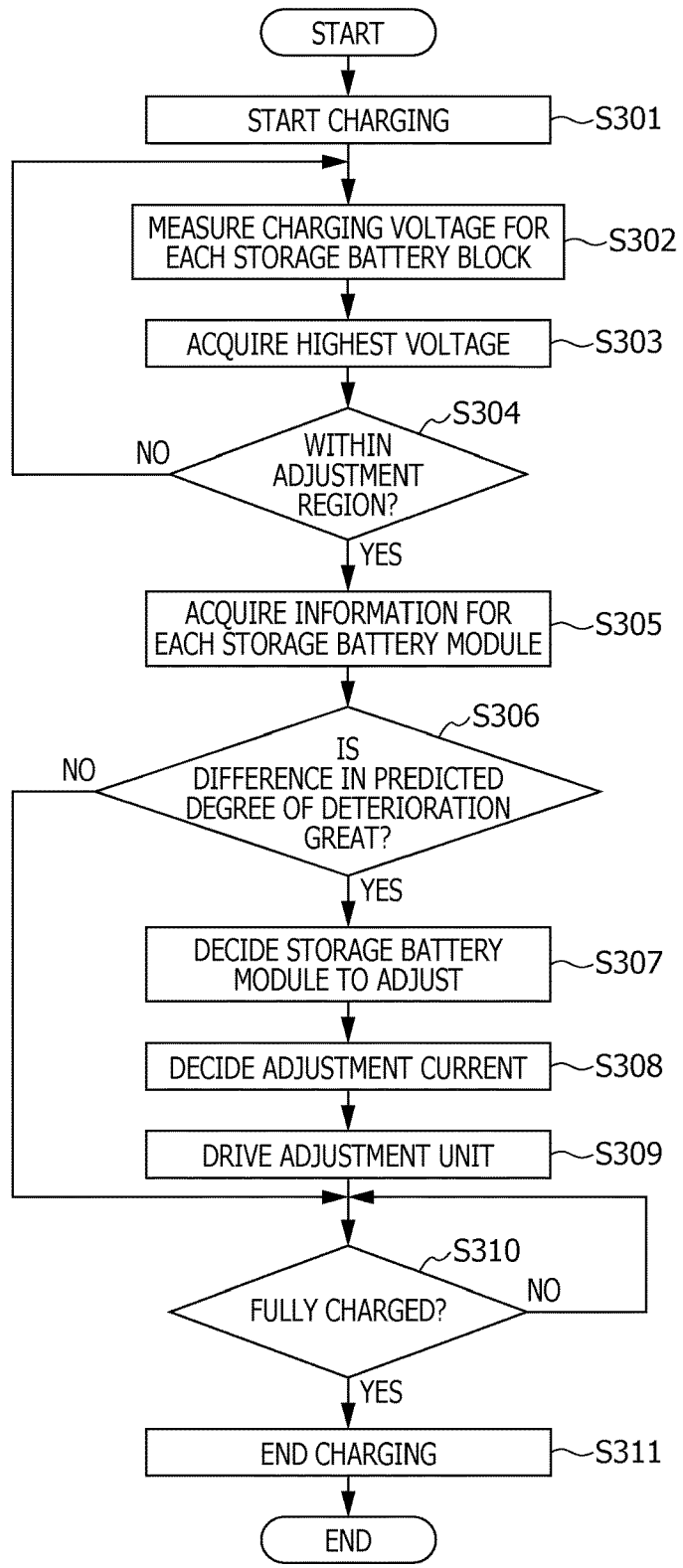
FIG. 20 is a flowchart illustrating the operations of the electricity storage device according to the second embodiment when charging.

FIG. 20 is a flowchart illustrating the operations of the electricity storage device 200 illustrated in FIG. 4 when charging. In this example, first, the control unit 280 starts charging of the storage battery modules 211, 212, and 213 (S301).

The control unit 280 then measures the charging voltage of each storage battery block of the storage battery modules 211, 212, and 213 via the detection units 231, 232, and 233 and so forth (S302). At each of the storage battery modules 211, 212, and 213, the control unit 280 then acquires charging voltage of the storage battery block of which the charging voltage is the highest (S303).

The control unit 280 then determines whether the highest charging voltage of each of the storage battery modules 211, 212, and 213 is within the adjustment range (S304). In a case where the highest charging voltage is not within the adjustment range (No in S304), the control unit 280 repeats the processing from the measuring of charging voltage (S302).

In a case where the highest charging voltage is within the adjustment range (Yes in S304), the control unit 280 acquires information of the storage battery modules 211, 212, and 213 to predict future degree of deterioration (S305). Information of the storage battery modules 211, 212, and 213 is information indicating the temperature, voltage, current, etc., of each storage battery block at the current point and multiple previous points or a previous period, for example.

Based on the information of the storage battery modules 211, 212, and 213, the control unit 280 predicts the future degree of deterioration of the storage battery modules 211, 212, and 213. The control unit 280 then predicts whether there is a great difference in predicted degree of deterioration among the storage battery modules 211, 212, and 213 (S306).

Specifically, the control unit 280 acquires predicted degree of deterioration of a storage battery block predicted to exhibit the greatest deterioration (greatest predicted degree of deterioration) for each of the storage battery modules 211, 212, and 213. The control unit 280 then determines whether the difference among the multiple predicted degrees of deterioration obtained from the storage battery modules 211, 212, and 213 is greater than a predetermined value. The control unit 280 may determine whether or not the difference in predicted degrees of deterioration is great by predicting whether a great difference among the storage battery modules 211, 212, and 213 will occur in the future.

If the difference in predicted degree of deterioration is not great (No in S306), the control unit 280 continues charging. On the other hand, in a case where the difference in predicted degree of deterioration is great (Yes in S306), the control unit 280 decides on a storage battery module to be adjusted (S307).

The control unit 280 then decides the adjustment current amount (S308). For example, the greater the predicted degree of deterioration is, the greater the control unit 280 sets the bypass current amount. The control unit 280 drives the adjusters 261, 262, and 263, and controls the adjusters 261, 262, and 263 so that current of the decided adjustment current amount flows (S309).

The adjustment current amount is decided here so that the storage battery module that has the greatest predicted degree of deterioration out of the storage battery modules 211, 212, and 213 does not reach full charge, and the adjusters 261, 262, and 263 are controlled so that current of the decided adjustment current amount flows. The storage battery module of which the predicted degree of deterioration is the greatest is the storage battery module out of the storage battery modules 211, 212, and 213 including a storage battery block regarding which prediction has been made that deterioration will be greatest.

The control unit 280 determines whether or not one of the storage battery modules 211, 212, and 213 has reached full charge, via the detection units 231, 232, 233, and so forth (S310). The control unit 280 continues charging until one of the storage battery modules 211, 212, and 213 is reaches full charge. When one of the storage battery modules 211, 212, and 213 reaches full charge, the control unit 280 ends charging (S311).

For example, the control unit 280 adjusts the amount of current flowing at the adjusters 261, 262, and 263 so that the storage battery module of the storage battery modules 211, 212, and 213 of which the predicted degree of deterioration is the smallest reaches full charge first. Note that the predicted degree of deterioration of the storage battery modules 211, 212, and 213 corresponds to the predicted degree of deterioration of the storage battery block regarding which prediction is made that deterioration will be greatest in each storage battery module.

Figure 21:
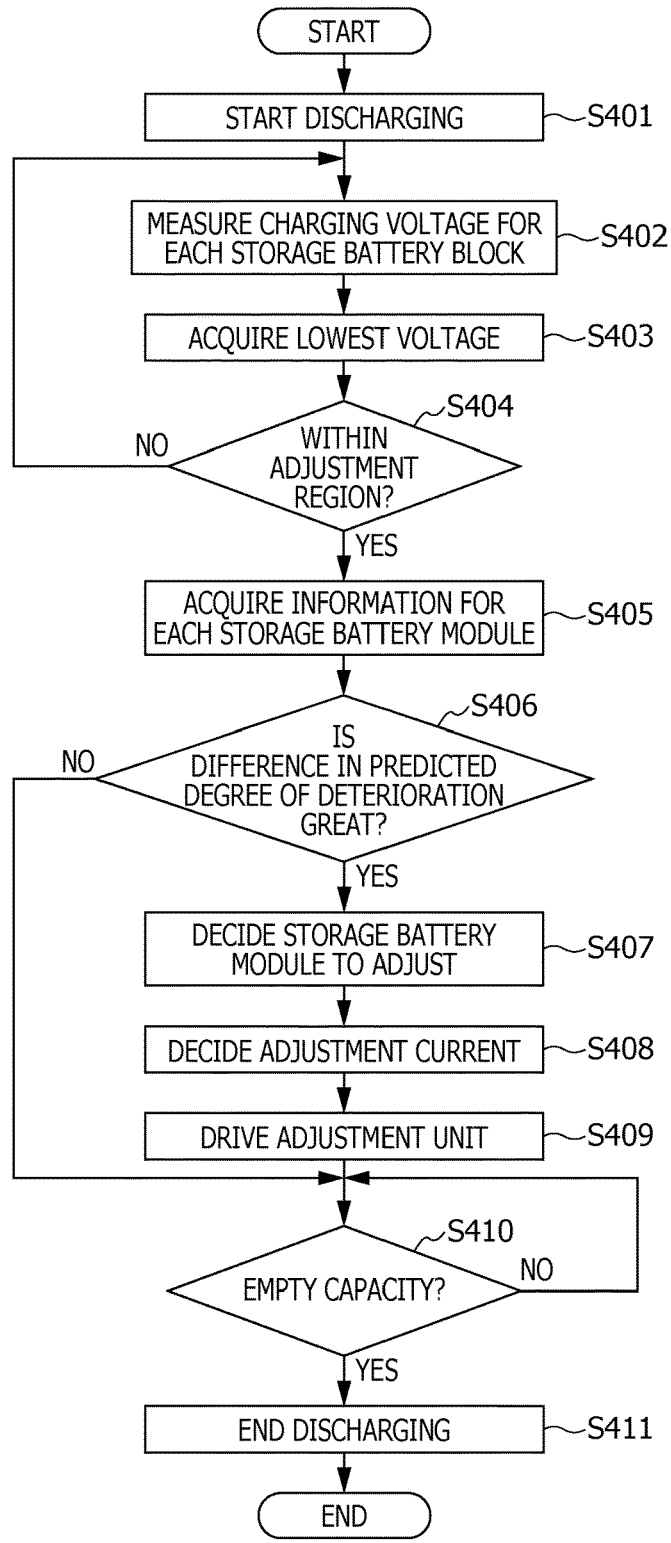
FIG. 21 is a flowchart illustrating the operations of the electricity storage device according to the second embodiment when discharging.

FIG. 21 is a flowchart illustrating the operations of the electricity storage device 200 illustrated in FIG. 4 when discharging. In this example, first, the control unit 280 starts discharging of the storage battery modules 211, 212, and 213 (S401).

The control unit 280 then measures the discharging voltage of each storage battery block of the storage battery modules 211, 212, and 213 via the detection units 231, 232, and 233 and so forth (S402). At each of the storage battery modules 211, 212, and 213, the control unit 280 then acquires discharging voltage of the storage battery block of which the discharging voltage is the lowest (S403).

The control unit 280 then determines whether the lowest charging voltage of each of the storage battery modules 211, 212, and 213 is within the adjustment range (S404). In a case where the lowest discharging voltage is not within the adjustment range (No in S404), the control unit 280 repeats the processing from the measuring of discharging voltage (S402).

In a case where the lowest discharging voltage is within the adjustment range (Yes in S404), the control unit 280 acquires information of the storage battery modules 211, 212, and 213 to predict future degree of deterioration (S405). Information of the storage battery modules 211, 212, and 213 is information indicating the temperature, voltage, current, etc., of each storage battery block at the current point and multiple previous points or a previous period, for example.

Based on the information of the storage battery modules 211, 212, and 213, the control unit 280 predicts the future degree of deterioration of the storage battery modules 211, 212, and 213. The control unit 280 then predicts whether there is a great difference in predicted degree of deterioration among the storage battery modules 211, 212, and 213 (S406).

Specifically, the control unit 280 acquires predicted degree of deterioration of a storage battery block predicted to exhibit the greatest deterioration (greatest predicted degree of deterioration) for each of the storage battery modules 211, 212, and 213. The control unit 280 then determines whether the difference among the multiple predicted degrees of deterioration obtained from the storage battery modules 211, 212, and 213 is greater than a predetermined value. The control unit 280 may determine whether or not the difference in predicted degrees of deterioration is great by predicting whether a great difference among the storage battery modules 211, 212, and 213 will occur in the future.

If the difference in predicted degree of deterioration is not great (No in S406), the control unit 280 continues discharging. On the other hand, in a case where the difference in predicted degree of deterioration is great (Yes in S406), the control unit 280 decides on a storage battery module to be adjusted (S407).

The control unit 280 then decides the adjustment current amount (S408). For example, the greater the predicted degree of deterioration is, the greater the control unit 280 sets the bypass current amount. The control unit 280 drives the adjusters 261, 262, and 263, and controls the adjusters 261, 262, and 263 so that current of the decided adjustment current amount flows (S409).

The adjustment current amount is decided here so that the storage battery module that has the greatest predicted degree of deterioration out of the storage battery modules 211, 212, and 213 does not reach empty capacity, and the adjusters 261, 262, and 263 are controlled so that current of the decided adjustment current amount flows. The storage battery module of which the predicted degree of deterioration is the greatest is the storage battery module out of the storage battery modules 211, 212, and 213 including a storage battery block regarding which prediction has been made that deterioration will be greatest.

The control unit 280 determines whether or not one of the storage battery modules 211, 212, and 213 has reached empty capacity, via the detection units 231, 232, 233, and so forth (S410). The control unit 280 continues discharging until one of the storage battery modules 211, 212, and 213 is reaches empty capacity. When one of the storage battery modules 211, 212, and 213 reaches empty capacity, the control unit 280 ends discharging (S411).

For example, the control unit 280 adjusts the amount of current flowing at the adjusters 261, 262, and 263 so that the storage battery module of the storage battery modules 211, 212, and 213 of which the predicted degree of deterioration is the smallest reaches empty capacity first. Note that the predicted degree of deterioration of the storage battery modules 211, 212, and 213 corresponds to the predicted degree of deterioration of the storage battery block regarding which prediction is made that deterioration will be greatest in each storage battery module.

Figure 22:
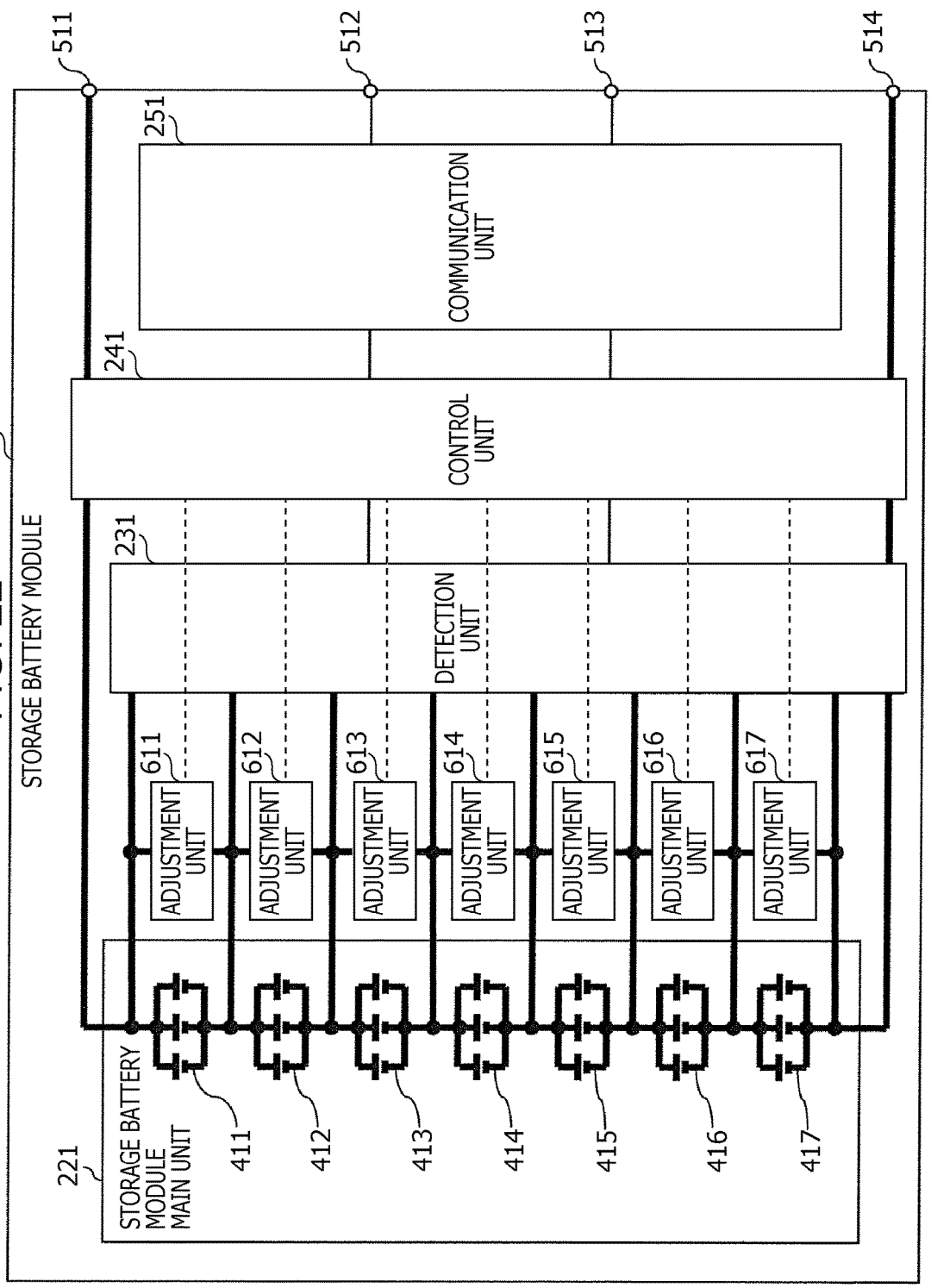
FIG. 22 is a block diagram illustrating another example of the configuration of the storage battery module according to the second embodiment.

FIG. 22 is a block diagram illustrating another example of the configuration of the storage battery module 211 illustrated in FIGS. 4 and 11. Specifically, the example in FIG. 22 has adjusters 611 through 617 added, as compared to the example in FIG. 11.

Although the arrangement in FIG. 4 has the adjusters 261, 262, and 263 disposed in parallel to the storage battery modules 211, 212, and 213, the arrangement in FIG. 22 has the adjusters 611 through 617 disposed in parallel to the storage battery blocks 411 through 417. The adjusters 611 through 617 may be provided instead of the adjusters 261, 262, and 263 illustrated in FIG. 4, or the adjusters 611 through 617 may be provided in addition to the adjusters 261, 262, and 263 illustrated in FIG. 4.

The storage battery module 211 illustrated in FIG. 22 may correspond to the electricity storage system 100 according to the first embodiment. the storage battery blocks 411 through 417 may correspond to the storage battery units 121, 122, and 123 according to the first embodiment. the adjusters 611 through 617 may correspond to the adjusters 141, 142, and 143 according to the first embodiment. The control unit 241 may correspond to the control unit 150 according to the first embodiment.

Paths passing through the storage battery blocks 411 through 417 may correspond to the first circuit 110 according to the first embodiment. Also, a path passing through the adjuster 611, a path passing through the adjuster 612, a path passing through the adjuster 613, a path passing through the adjuster 614, a path passing through the adjuster 615, a path passing through the adjuster 616, and a path passing through the adjuster 617, may correspond to the second circuits 131, 132, and 133 according to the first embodiment.

For example, the control unit 241 of the storage battery module 211 operates in the same way as the control unit 280 of the electricity storage device 200, and the adjusters 611 through 617 operate in the same way as the adjusters 261, 262, and 263 of the electricity storage device 200. Accordingly, the storage battery blocks 411 through 417 are controlled in the same way as the storage battery modules 211, 212, and 213, either instead of the storage battery modules 211, 212, and 213 or in addition to the storage battery modules 211, 212, and 213.

More specifically, control is effected such that, in a case where there is no difference in the degree of deterioration among the storage battery blocks 411 through 417, a storage battery block of which the predicted degree of deterioration is small reaches full charge voltage or empty capacity voltage before a storage battery block of which the predicted degree of deterioration is great. Accordingly, advance in deterioration of a storage battery block in the storage battery blocks 411 through 417 of which the predicted degree of deterioration is great is suppressed, and local advance in deterioration is suppressed.

Note that the storage battery modules 212 and 213 may have a configuration equivalent to that of the storage battery module 211 illustrated in FIG. 22. Accordingly, local advance in deterioration is suppressed at each of the storage battery modules 211, 212, and 213, and longevity of each of the storage battery modules 211, 212, and 213 can be realized.

Figure 23:
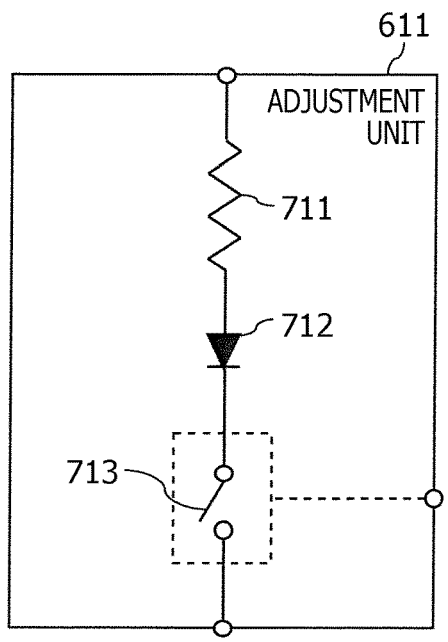
FIG. 23 is a schematic diagram illustrating the configuration of the adjuster included in the storage battery module according to the second embodiment.

FIG. 23 is a schematic diagram illustrating the configuration of the adjuster 611 included in the storage battery module 211 illustrated in FIG. 22. The adjuster 611 illustrated in FIG. 23 includes, for example, a resistor 711, a diode 712, and a switch 713. These are components that are equivalent to the resistor 311, diode 312, and switch 313 illustrated in FIG. 5. That is to say, the adjuster 611 may have the same configuration as the adjuster 261.

Note that the adjuster 611 illustrated in FIG. 23 has a configuration equivalent to the adjuster 261 illustrated in FIG. 5, but the adjuster 611 may have a configuration equivalent to the adjuster 261 illustrated in FIG. 9. The adjusters 612 through 617 may also have configurations equivalent to the adjuster 611.

Deterioration of storage batteries will be described with reference to FIGS. 24 and 25. Although an example of a storage battery will be used for sake of convenience, deterioration of the storage battery blocks 411 through 417 and deterioration of the storage battery modules 211, 212, and 213 is the same as deterioration of a storage battery.

Figure 24:
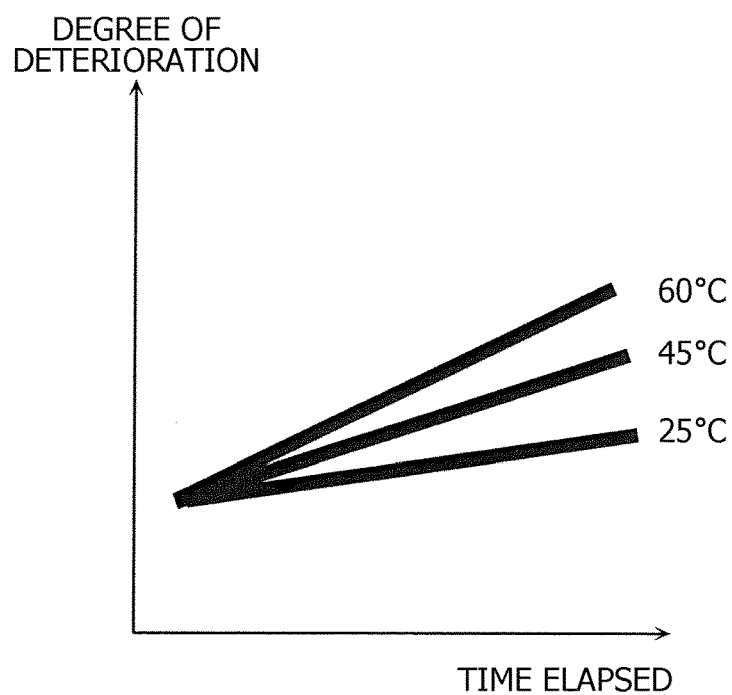
FIG. 24 is a relational diagram illustrating the relationship between elapse of time and degree of deterioration, with regard to the storage battery according to the second embodiment.

FIG. 24 is a relationship diagram illustrating the relationship between time elapsed and degree of deterioration, with regard to the storage battery illustrated in FIG. 11. The temperature value illustrated in FIG. 24 corresponds to a value of the ambient temperature around the storage battery. It can be seen from FIG. 24 that deterioration of the storage battery advances with passage of time. The higher the temperature, the faster the advance in time is.

Figure 25:
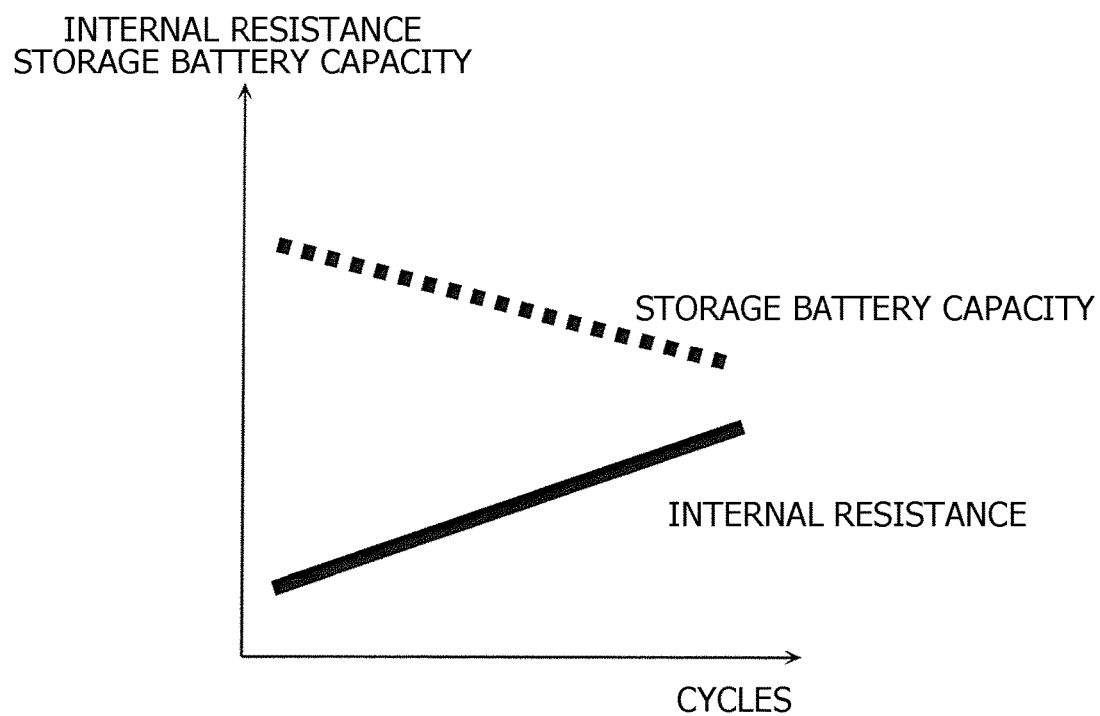
FIG. 25 is a relational diagram illustrating the relationship between number of cycles and internal resistance, with regard to the storage battery according to the second embodiment.

FIG. 25 is a relational diagram illustrating the relationship between cycles and internal resistance with regard to the storage battery illustrated in FIG. 11. It can be seen from FIG. 25 that the internal resistance of the storage battery increases as the number of cycles of charging/discharging decreases. As the number of cycles of charging/discharging increases, the capacity of the storage battery that corresponds to the full-charge capacity increases. That is to say, deterioration increases along with the increase in the number of cycles of charging/discharging.

Figure 26:
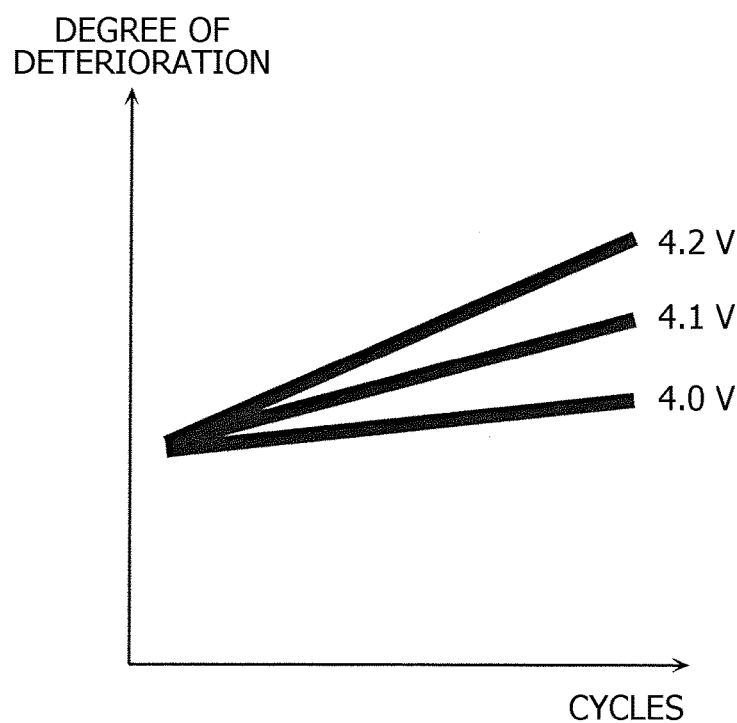
FIG. 26 is a relational diagram illustrating the relationship between number of cycles and charging voltage, with regard to the storage battery according to the second embodiment.

FIG. 26 is a relational diagram illustrating the relationship between the number of cycles and charging voltage with regard to the storage battery illustrated in FIG. 11. The voltage value illustrated in FIG. 26 corresponds to the charging voltage value of the storage battery. It can be seen from FIG. 26 that deterioration of the storage battery advances as the number of cycles of charging/discharging increases. Also, the higher the charging voltage is, the faster the advance of deterioration is. In discharging, the lower the discharging voltage is, the faster the advance of deterioration is.

In a case where the capabilities of multiple storage batteries are the same, for example, there will be variation in the degree of deterioration due to variation in temperature at the multiple storage batteries, as illustrated in FIG. 24. When the degree of deterioration is great, internal resistance rises, and charging voltage rises.

Accordingly, if no adjustment is performed, a storage battery having a greater degree of deterioration will reach full charge before a storage battery with a smaller degree of deterioration. Charging will then be performed at the storage battery having the greater degree of deterioration at a state where the charging voltage is higher than the storage batteries with smaller degree of deterioration. Thus, the deterioration further advances as the storage battery having the high degree of deterioration, due to this charging voltage.

On the other hand, the storage battery having the smaller degree of deterioration ends charging at a state where the charging voltage is low. Thus, deterioration does not readily advance at the storage battery having the smaller degree of deterioration. Accordingly, the difference in degree of deterioration tends to spread between the storage battery with a great degree of deterioration and the storage battery with the small degree of deterioration, if no adjustment is performed. The same holds true for discharging as well; the difference in degree of deterioration tends to spread between the storage battery with a great degree of deterioration and the storage battery with the small degree of deterioration, if adjustment is not performed in the same way as with charging.

In the present embodiment, in a state where there is no difference in the degree of deterioration among the storage batteries, control is effected so that the charging voltage is lower for the storage battery of which the predicted degree of deterioration is great. Also, in a state where there is no difference in the degree of deterioration among the storage batteries, control is effected so that the discharging voltage is higher for the storage battery of which the predicted degree of deterioration is great. Increase in the number of charging/discharging cycles is suppressed for the storage battery of which the predicted degree of deterioration is great. Thus suppresses advance of deterioration at the storage battery of which the predicted degree of deterioration is great.

Figure 27:
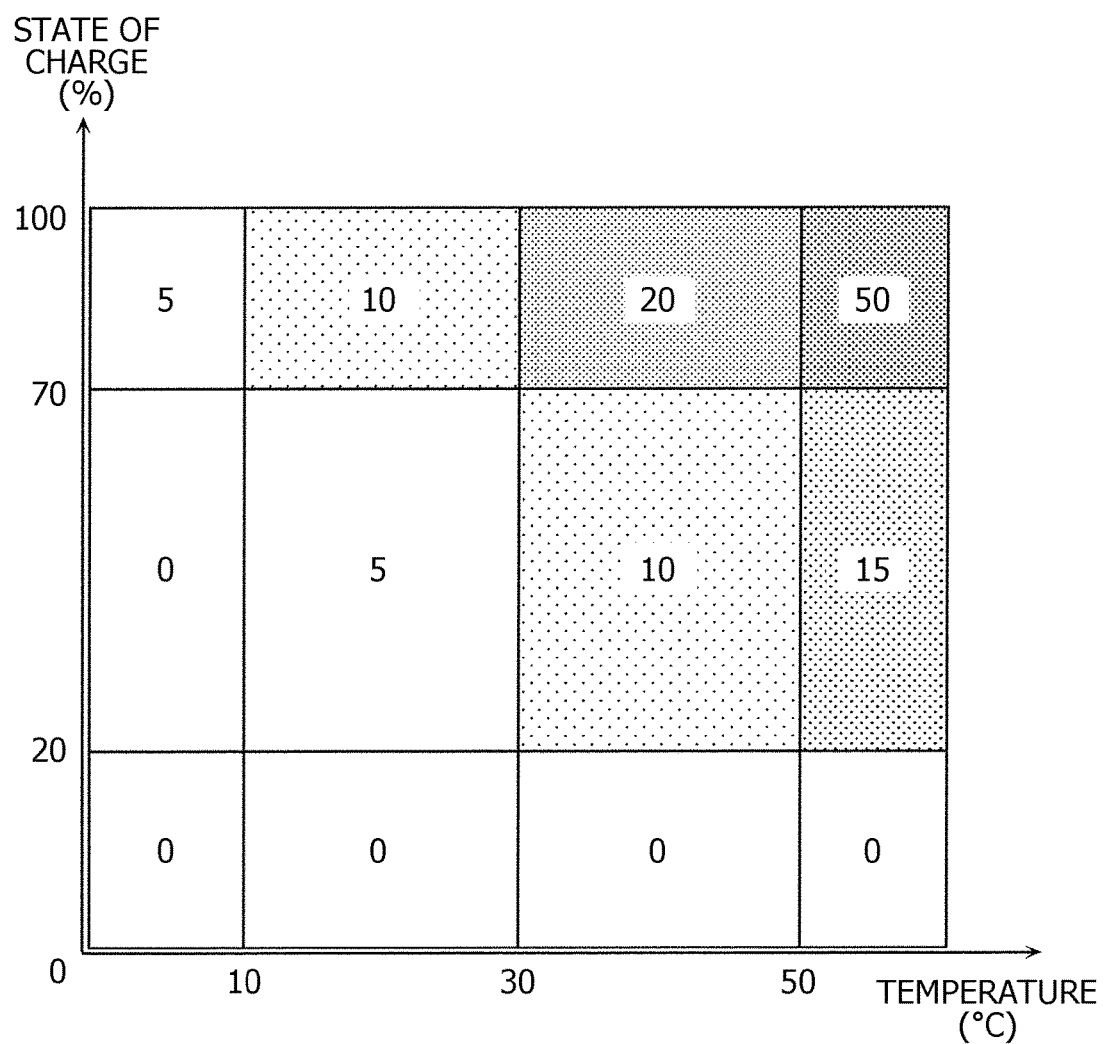
FIG. 27 is a relational diagram illustrating the relationship between Charging state, temperature, and degree of deterioration, with regard to the storage battery according to the second embodiment.

FIG. 27 is a relational diagram illustrating the relationship between charge state, temperature, and deterioration coefficient, regarding the storage battery illustrated in FIG. 11. The charge state in FIG. 27 is also called "State of Charge (SOC)", and represents the percentage of remaining capacity as to full charge capacity. The temperature in FIG. 27 corresponds to the temperature of the storage battery. The deterioration coefficient in FIG. 27 corresponds to the rate of advance of deterioration. Specifically, the greater the deterioration coefficient is, the more readily and faster deterioration advances.

The higher the charge state is, the more readily deterioration advances, as illustrated in FIG. 27. Also, the higher the temperature is, the more readily deterioration advances. In a state where there is not difference in the degree of deterioration among the storage batteries, the electricity storage device 200 according to the present embodiment can suppress advance of deterioration by lowering the charge state using the adjusters 261, 262, and 263 before the temperature of the storage battery reaches a predetermined temperature.

As described above, the electricity storage device 200 according to the present embodiment can appropriately control charging/discharging of the storage battery modules 211, 212, and 213 using the adjusters 261, 262, and 263. The electricity storage device 200 can thus extend the longevity of the storage battery modules 211, 212, and 213 as a whole.

Note that the amount of current flowing through the adjusters 261, 262, and 263 corresponds to the magnitude of the predicted degree of deterioration. Accordingly, the electricity storage device 200 may issue a notification prompting switching the positions of the storage battery modules 211, 212, and 213 based on the amount of current flowing through the adjusters 261, 262, and 263. Notification may be performed by communication, or may be output to a screen or the like that the electricity storage device 200 has.

For example, in the difference between the amount of current flowing through the adjuster 261 and the amount of current flowing through the adjuster 262 a predetermined value or more, the difference in predicted degree of deterioration of the storage battery module 211 and predicted degree of deterioration of the storage battery module 212 can be estimated to be great. Accordingly, the electricity storage device 200 may issue a notification prompting switching the positions of the storage battery module 211 and storage battery module 212.

Switching the positions of the storage battery module 211 and the storage battery module 212 makes the degree of deterioration uniform, based on the placement. Accordingly, local advance in deterioration is suppressed in the storage battery modules 211, 212, and 213, and the longevity of the storage battery modules 211, 212, and 213 is extended as a whole.

In a configuration where the greater an adjustment current amount flows the smaller the predicted degree of deterioration is, as illustrated in FIG. 8, the electricity storage device 200 may periodically confirm the predicted degree of deterioration, and change the adjustment current amount in accordance with the difference as to the greatest predicted degree of deterioration. For example, in a case where there is no difference in the degree of deterioration among the storage battery modules, and prediction is made that the storage battery module 211 will deteriorate most, the electricity storage device 200 may change the adjustment current amount at the adjuster 262 based on the difference between the predicted degree of deterioration of the storage battery module 211 and the predicted degree of deterioration of the storage battery module 212.

When discarding the storage battery modules 211, 212, and 213, the electricity storage device 200 may discharge all of the storage battery modules 211, 212, and 213 using the second circuits passing through the adjusters 261, 262, and 263, so that all reach empty capacity. This discharging power may be consumed at the adjusters 261, 262, and 263. Accordingly, the storage battery modules 211, 212, and 213 can be appropriately disposed of.

In the same way, when discarding the storage battery module 211, the electricity storage device 200 may discharge all of the storage battery blocks 411 through 417 using the second circuits passing through the adjusters 611 through 617, so that all reach empty capacity. Accordingly, the storage battery module 211 can be appropriately disposed of.

When the charge state is higher than a predetermined value and the temperature is higher than a predetermined value, the electricity storage device 200 may discharge the storage battery modules 211, 212, and 213 using the second circuits passing through the adjusters 261, 262, and 263. This discharging power may be consumed at the adjusters 261, 262, and 263. Thus, the charge state is lower, and advance of deterioration is suppressed.

The electricity storage device 200 may automatically detect high charge states and high temperature by the detection units 231, 232, and 233, and perform discharging, or may perform discharging following external instructions. This operation can be also applied to the storage battery blocks 411 through 417 using the adjusters 611 through 617.

As described above, multiple storage battery units can be appropriately controlled by the electricity storage device and so forth according to the present disclosure. In the above-described embodiments, the components may be configured as dedicated hardware, or may be realized by executing software programs corresponding to the components. The components may be realized by a program executing unit such as a CPU or a like processor reading out and executing software programs recorded in a recording medium such as a hard disk or semiconductor memory or the like. The following is an example of software the realizes the electricity storage system according to the above-described embodiments.

That is to say, this program causes a computer to execute an electricity storage system control method that includes: executing at least one of first control of, in charging of a plurality of storage battery units that are serially connected, (a) adjusting the amount of current flowing at circuits that are connected in parallel as to each of the plurality of storage battery units, so a voltage at a first storage battery unit out of the plurality of storage battery units is set to be higher than voltage at a second storage battery unit out of the plurality of storage battery units regarding which prediction has been made that a degree of deterioration will be greater than the degree of deterioration of the first storage battery unit, and (b) stopping charging of the plurality of storage battery units in a state where the voltage of the first storage battery unit is higher than the voltage of the second storage battery unit, and second control of, in discharging of the plurality of storage battery units, (c) adjusting the amount of current flowing at the circuits that are connected in parallel as to each of the plurality of storage battery units, so voltage at the first storage battery unit is set to be lower than voltage at the second storage battery unit, and (d) stopping discharging of the plurality of storage battery units in a state where the voltage of the first storage battery unit is lower than the voltage of the second storage battery unit.

The components may be circuits in the above-described embodiments. Multiple components may make up one circuit as a whole, or the circuits may be configured individually. The circuits may each be general-purpose circuits, or may be dedicated circuits.

Although the electricity storage system according to one or more aspects has been described by way of embodiments, the present disclosure is not restricted to the embodiments. One skilled in the art will be able to make various modifications of the embodiments and combinations of components in different embodiments without departing from the spirit and scope of the present disclosure, and all such modifications and combinations are encompassed by one or more aspects.

For example, a component in an embodiment above may execute processing that another particular component executes, instead of that particular component. The order of multiple processes may be changed, and multiple processes may be executed in parallel.

The present disclosure is usable in a electricity storage system that controls multiple storage battery units, and is applicable to a power supply device, electric equipment having a power supply device, and so forth.

What is claimed is:

1. A system, comprising:
   a first circuit that serially connects storage battery units;
   second circuits that are connected in parallel to the storage battery units, corresponding to each of the storage battery units;
   adjusters that adjust an amount of current flowing at the second circuits; and
   a controller that executes at least one of
      first control where, in charging of the storage battery units through the first circuit, the controller causes the adjusters to make a voltage at a first storage battery unit of the storage battery units higher than a voltage at a second storage battery unit of the storage battery units regarding which prediction has been made that a degree of deterioration will be greater than the degree of deterioration of the first storage battery unit by adjusting the amount of current flowing at the second circuits, and then stops charging, and
      second control where, in discharging of the storage battery units through the first circuit, the controller causes the adjusters to make voltage at the first storage battery unit lower than voltage at the second storage battery unit of the storage battery units regarding which prediction has been made that a degree of deterioration will be greater than the degree of deterioration of the first storage battery unit by adjusting the amount of current flowing at the second circuits, and then stops discharging.

2. The system according to claim 1,
   wherein the second circuits are circuits where, in charging of the storage battery units through the first circuit, current flows bypassing the storage battery units regarding which the second circuits are connected in parallel,
   and wherein in the first control, the controller causes the adjusters to make the voltage of the first storage battery unit higher than the voltage of the second storage battery unit by making the current flowing at the second circuit connected in parallel to the first storage battery unit smaller than the current flowing at the second circuit connected in parallel to the second storage battery unit, and then stops charging.

3. The system according to claim 1,
   wherein the second circuits are circuits where, in charging of the plurality of storage battery units through the first circuit, discharge current of the storage battery units regarding which the second circuits are connected in parallel flows,
   and wherein in the first control, the controller causes the adjusters to make the voltage of the first storage battery unit higher than the voltage of the second storage battery unit by making the current flowing at the second circuit connected in parallel to the first storage battery unit smaller than the current flowing at the second circuit connected in parallel to the second storage battery unit, and then stops charging.

4. The system according to claim 3,
   wherein, at the timing of at least one of before starting charging of the plurality of storage battery units through the first circuit and during interruption of charging thereof, the controller causes the adjuster to make the voltage of the first storage battery unit higher than the voltage of the second storage battery unit by making the current flowing at the second circuit connected in parallel to the first storage battery unit smaller than the current flowing at the second circuit connected in parallel to the second storage battery unit.

5. The system according to claim 1,
   wherein the second circuits are circuits where, in discharging of storage battery units through the first circuit, current flows bypassing the storage battery units regarding which the second circuits are connected in parallel,
   and wherein in the second control, the controller causes the adjusters to make the voltage of the first storage battery unit lower than the voltage of the second storage battery unit by making the current flowing at the second circuit connected in parallel to the first storage battery unit smaller than the current flowing at the second circuit connected in parallel to the second storage battery unit, and then stops discharging.

6. The system according to claim 1,
   wherein the second circuits are circuits where, in discharging of the plurality of storage battery units through the first circuit, discharge current of the storage battery units regarding which the second circuits are connected in parallel flows, and
   wherein in the second control, the controller causes the adjusters to make the voltage of the first storage battery unit lower than the voltage of the second storage battery unit by making the current flowing at the second circuit connected in parallel to the first storage battery unit greater than the current flowing at the second circuit connected in parallel to the second storage battery unit, and then stops discharging.

7. The system according to claim 6,
   wherein, at the timing of at least one of before starting discharging of the plurality of storage battery units through the first circuit and during interruption of discharging thereof, the controller causes the adjuster to make the voltage of the first storage battery unit higher than the voltage of the second storage battery unit by making the current flowing at the second circuit connected in parallel to the first storage battery unit higher than the current flowing at the second circuit connected in parallel to the second storage battery unit.

8. The system according to claim 1,
wherein, in the first control, the controller raises the voltage of the first storage battery unit to a charging end voltage, raises the voltage of the second storage battery unit to a voltage lower than the charging end voltage, and then stops charging.

9. The system according to claim 1,
wherein, in the second control, the controller lowers the voltage of the first storage battery unit to a discharging end voltage, lowers the voltage of the second storage battery unit to a voltage higher than the discharging end voltage, and then stops discharging.

10. The system according to claim 1,
wherein, in charging of the plurality of storage battery units through the first circuit, the controller does not execute the first control but executes charging of the plurality of storage battery units through the first circuit, and then executes the first control.

11. The system according to claim 1,
wherein, in discharging of the plurality of storage battery units through the first circuit, the controller does not execute the second control but executes discharging of the plurality of storage battery units through the first circuit, and then executes the second control.

12. The system according to claim 1,
wherein the first storage battery unit is a storage battery unit regarding which prediction is made that the degree of deterioration will be the smallest out of storage battery units.

13. The system according to claim 1,
wherein the second storage battery unit is a storage battery unit regarding which prediction is made that the degree of deterioration will be the greatest out of storage battery units.

14. The system according to claim 1,
wherein each of storage battery units includes storage batteries, and
wherein the first storage battery unit is a storage battery unit including a storage battery regarding which prediction is made that the degree of deterioration will be the smallest in storage batteries made up of a storage battery in each of storage battery units regarding which prediction is made that the degree of deterioration will be the greatest in each storage battery unit.

15. The electricity storage system according to claim 1,
wherein each of storage battery units includes storage batteries, and
wherein the first storage battery unit is a storage battery unit including a storage battery regarding which prediction is made that the degree of deterioration will be the greatest in storage batteries made up of a storage cell in each of storage battery units regarding which prediction is made that the degree of deterioration will be the greatest in each storage battery unit.

16. The electricity storage system according to claim 1, further comprising:
detectors that detect a state function of each of storage battery units,
wherein the controller
causes the adjusters to stop current flowing at the second circuits, and
predicts advance of degree of deterioration of the storage battery units based on a state function detected by the detection units while the current flowing at the second circuits is stopped.

17. A method, comprising:
executing at least one of
first control of, in charging of a plurality of storage battery units that are serially connected, (a) making a voltage at a first storage battery unit out of the plurality of storage battery units higher than voltage at a second storage battery unit out of the plurality of storage battery units regarding which prediction has been made that a degree of deterioration will be greater than the degree of deterioration of the first storage battery unit by adjusting the amount of current flowing at circuits that are connected in parallel as to each of the plurality of storage battery units, and (b) then stopping charging of the plurality of storage battery units in a state where the voltage of the first storage battery unit is higher than the voltage of the second storage battery unit, and
second control of, in discharging of the plurality of storage battery units, (c) making voltage at the first storage battery unit lower than voltage at the second storage battery unit out of the plurality of storage battery units regarding which prediction has been made that a degree of deterioration will be greater than the degree of deterioration of the first storage battery unit by adjusting the amount of current flowing at the circuits that are connected in parallel as to each of the plurality of storage battery units, and (d) then stopping discharging of the plurality of storage battery units in a state where the voltage of the first storage battery unit is lower than the voltage of the second storage battery unit.

18. The system according to claim 1,
wherein the controller executes the first control and the second control.

19. The method according to claim 17,
wherein the method executes the first control and the second control.

20. The system according to claim 1,
wherein the adjusters include one or more diodes.

21. The method according to claim 17,
wherein the circuits at which the adjusting is performed includes one or more diodes.

* * * * *